(12) United States Patent
Harmand et al.

(10) Patent No.: US 6,530,727 B2
(45) Date of Patent: Mar. 11, 2003

(54) CONTOUR MACHINING HEAD

(75) Inventors: Brice Harmand, La Jolla, CA (US); Pierre Harmand, Annecy (FR)

(73) Assignee: Harmand Family Limited Partnership, San Diego, CA (US)

( * ) Notice: Subject to any disclaimer, the term of this patent is extended or adjusted under 35 U.S.C. 154(b) by 55 days.

(21) Appl. No.: 09/828,543

(22) Filed: Apr. 6, 2001

(65) Prior Publication Data

US 2001/0018012 A1 Aug. 30, 2001

Related U.S. Application Data

(63) Continuation-in-part of application No. 09/521,333, filed on Mar. 9, 2000, now Pat. No. 6,382,883, which is a continuation-in-part of application No. 09/153,766, filed on Sep. 15, 1998, now Pat. No. 6,086,293.
(60) Provisional application No. 60/081,481, filed on Apr. 13, 1998, provisional application No. 60/195,671, filed on Apr. 7, 2000, and provisional application No. 60/239,620, filed on Oct. 11, 2000.

(51) Int. Cl.$^7$ .......................... B23B 35/00; B23B 47/00
(52) U.S. Cl. .................. 408/1 R; 408/82; 408/83.5; 408/143; 409/131; 409/141; 74/573 R; 29/888.44
(58) Field of Search .............................. 408/1 R, 3, 82, 408/83.5, 143, 186, 238; 409/131, 141, 234; 74/573 R; 29/888.44, 890.122

(56) References Cited

U.S. PATENT DOCUMENTS

| | | |
|---|---|---|
| 897,041 A | 8/1908 | Weller |
| 2,660,463 A | 11/1953 | Briney, Jr. |
| 2,693,965 A | 11/1954 | Briney, Jr. |
| 2,875,390 A | 2/1959 | Tripp |
| 2,901,927 A | 9/1959 | Morgan |
| 3,002,404 A | 10/1961 | Estabrook |
| 3,109,329 A | 11/1963 | Knosp et al. |
| 3,125,796 A | 3/1964 | Brainard |
| 3,259,957 A | 7/1966 | Stobbe |
| 3,273,182 A | 9/1966 | McDonald |
| 3,311,003 A | 3/1967 | Daugherty |

(List continued on next page.)

FOREIGN PATENT DOCUMENTS

| | | |
|---|---|---|
| DE | 825783 C | 12/1951 |
| DE | 4322435 A1 | 1/1995 |
| EP | 0300959 | 1/1989 |
| EP | 0467372 A2 | 1/1992 |
| FR | 2383738 A1 | 3/1778 |
| WO | WO9204152 | 3/1992 |
| WO | wo 9602346 A1 | 2/1996 |

OTHER PUBLICATIONS

Newen, Contour EPOC brochure: "On All Circuits and For All O.E.M.s, Advanced Techniques Are Essential," 2001.
Narex Automatic Boring & Facing Heads 1998 Catalog p. 2102.

*Primary Examiner*—Gregory M. Vidovich
*Assistant Examiner*—Essama Omgba
(74) *Attorney, Agent, or Firm*—Kilpatrick Stockton LLP; Eleanor M. Musick

(57) ABSTRACT

The machining head for machining valve seats comprises a driving system, a housing, a carriage feed assembly, a cutting tip mounted on the carriage, and a counterweight assembly. The driving system rotates a machining head on a spindle axis, and further provides independent vertical translation of each of a driving arbor and a spindle, both of which are independent of the rotation of the spindle. The carriage has both forward and backward feed capability for moving the cutting tip radially inward or outward as it cuts. Vertical movement of the arbor is converted into force for moving the carriage by a cantilever pivoting around a fixed point. The counterweight assembly, linked to the arbor by a second cantilever, counterbalances the shift in weight caused by the movement of the carriage in order to maintain dynamic balancing as the machining head rotates.

38 Claims, 23 Drawing Sheets

U.S. PATENT DOCUMENTS

| | | |
|---|---|---|
| 3,548,172 A | 12/1970 | Centner et al. |
| 3,559,256 A | 2/1971 | Lemelson |
| 3,605,909 A | 9/1971 | Lemelson |
| 3,685,022 A | 8/1972 | Raynes |
| 3,728,940 A | 4/1973 | Peterson |
| 3,730,636 A | 5/1973 | Mizoguchi |
| 4,147,462 A | 4/1979 | Appleby |
| 4,386,532 A | 6/1983 | Benjamin |
| 4,400,118 A | 8/1983 | Yamakage et al. |
| 4,545,706 A | 10/1985 | Hiroyasu |
| 4,555,205 A | 11/1985 | Hiroyasu |
| 4,611,958 A | 9/1986 | Vasilchenko |
| 4,624,607 A | 11/1986 | Kato et al. |
| 4,630,977 A | 12/1986 | Theofanous |
| 4,643,623 A | 2/1987 | Kondo |
| 4,678,379 A | 7/1987 | Sunday |
| 4,716,657 A | 1/1988 | Collingwood |
| 4,753,556 A | 6/1988 | Solko |
| 4,778,313 A | 10/1988 | Lehmkuhl |
| 4,789,280 A | 12/1988 | Dobat |
| 4,792,265 A | 12/1988 | Rottler |
| 4,836,719 A | 6/1989 | Field |
| 4,842,452 A | 6/1989 | Strait |
| 4,872,789 A | 10/1989 | Field |
| 4,913,601 A | 4/1990 | Tenand |
| 4,966,460 A | 10/1990 | Kahley |
| 5,001,871 A | 3/1991 | Harmand |
| 5,017,062 A | 5/1991 | Leroux |
| 5,044,841 A | 9/1991 | Biera |
| 5,074,723 A * | 12/1991 | Massa et al. ............... 279/129 |
| 5,125,299 A | 6/1992 | Strait |
| 5,154,554 A * | 10/1992 | Ariyoshi ................... 408/143 |
| 5,170,103 A * | 12/1992 | Rouch et al. ............... 318/128 |
| 5,240,358 A * | 8/1993 | Hackett et al. ............. 409/141 |
| 5,263,995 A * | 11/1993 | Mogilnicki et al. ......... 408/143 |
| 5,302,057 A | 4/1994 | Siegfried |
| 5,399,058 A | 3/1995 | Harmand |
| 5,439,329 A | 8/1995 | Marron |
| 5,445,478 A | 8/1995 | Ordogh |
| 5,478,177 A * | 12/1995 | Romi ......................... 408/143 |
| 5,533,847 A | 7/1996 | Basteck |
| 5,549,019 A * | 8/1996 | Cattani ...................... 408/143 |
| 5,613,809 A | 3/1997 | Harmand |
| 5,620,284 A | 4/1997 | Ueda |
| 5,725,335 A | 3/1998 | Harmand |
| 5,769,576 A | 6/1998 | Gerard |
| 5,810,527 A * | 9/1998 | Jager et al. ................. 408/143 |
| 5,829,928 A | 11/1998 | Harmand |
| 5,902,078 A * | 5/1999 | Kaiser et al. ............... 408/143 |
| 5,975,816 A * | 11/1999 | Cook ......................... 279/158 |
| 6,029,098 A | 2/2000 | Serizawa et al. |
| 6,053,678 A * | 4/2000 | D'Andrea ................... 408/143 |
| 6,086,293 A | 7/2000 | Harmand |
| 6,109,842 A * | 8/2000 | Cook ......................... 279/103 |
| 6,178,637 B1 | 1/2001 | Herold et al. |
| 6,231,280 B1 * | 5/2001 | Bullen ........................ 408/13 |
| 6,250,155 B1 * | 6/2001 | Hormann et al. ........... 409/131 |
| 6,279,420 B1 * | 8/2001 | Knorowski et al. ......... 409/141 |
| 6,280,126 B1 * | 8/2001 | Slocum et al. ............... 279/52 |
| 6,287,057 B1 * | 9/2001 | Kurz .......................... 408/1 R |
| 6,345,942 B1 * | 2/2002 | Cook .......................... 408/1 R |
| 6,364,581 B2 * | 4/2002 | Dyer et al. .................. 408/143 |
| 6,382,883 B1 * | 5/2002 | Harmand et al. ........ 29/888.44 |
| 6,382,884 B1 * | 5/2002 | Harmand et al. ........... 408/1 R |
| 6,382,888 B2 * | 5/2002 | Cook ......................... 279/103 |
| 6,419,427 B1 * | 7/2002 | Galamba et al. ............ 408/1 R |

\* cited by examiner

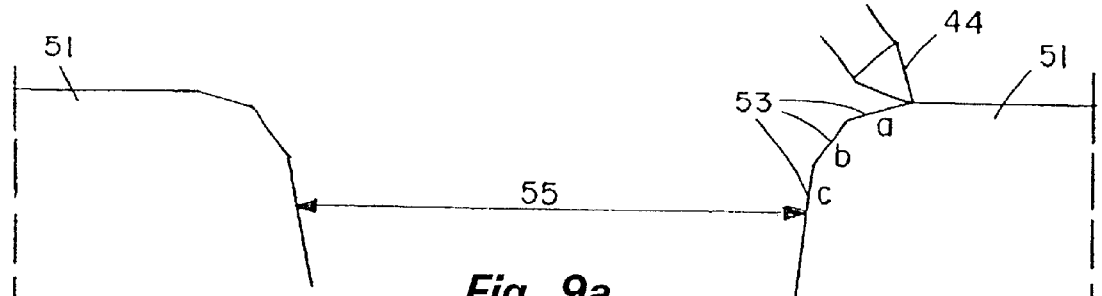
*Fig. 9a*
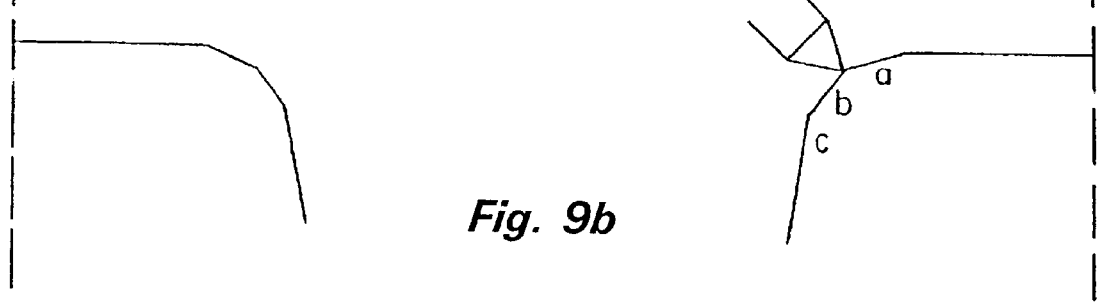
*Fig. 9b*
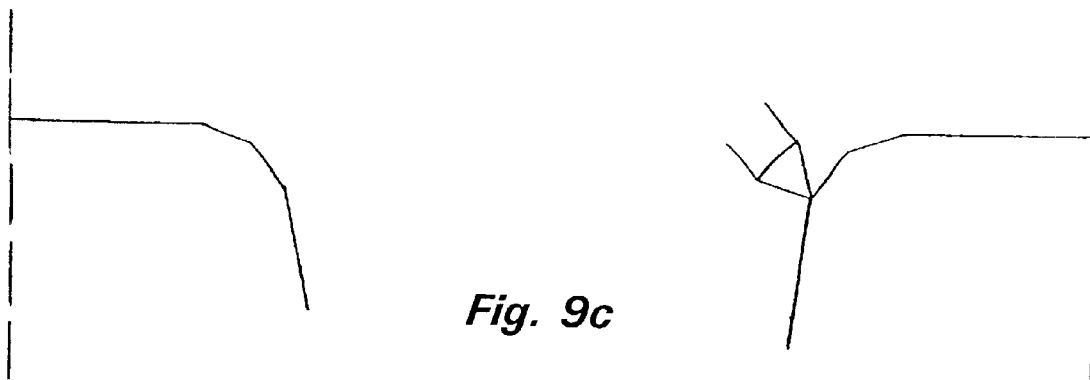
*Fig. 9c*
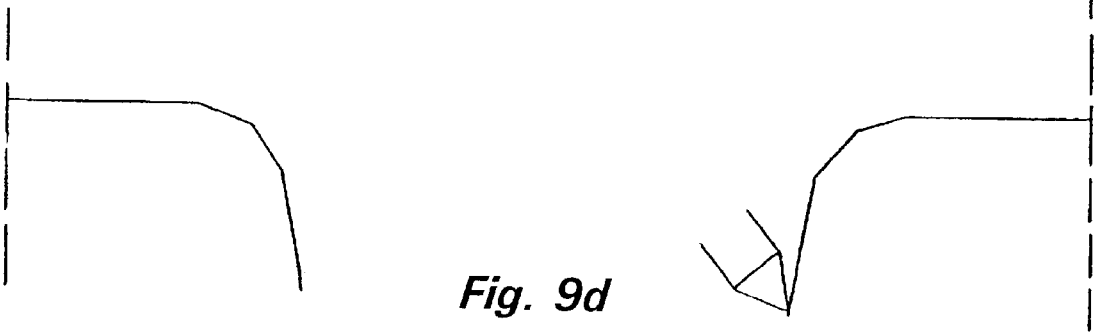
*Fig. 9d*
*Fig. 9*

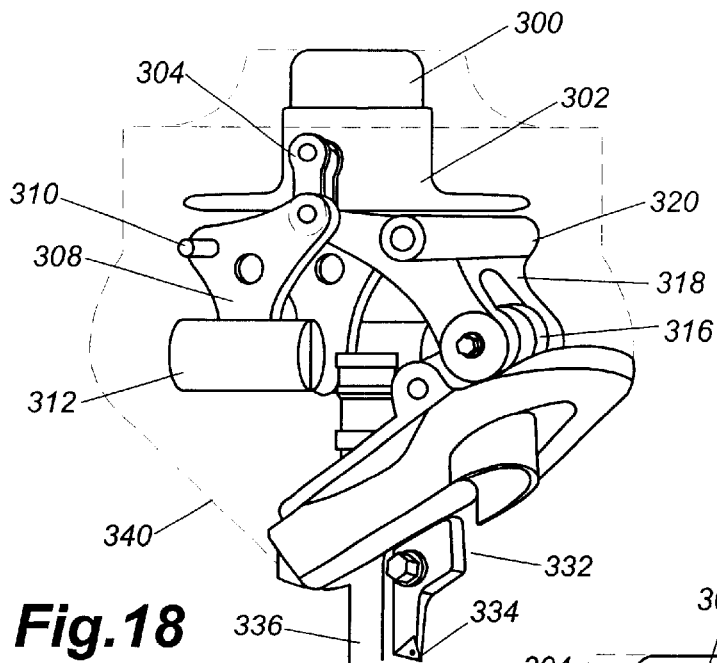
Fig.18
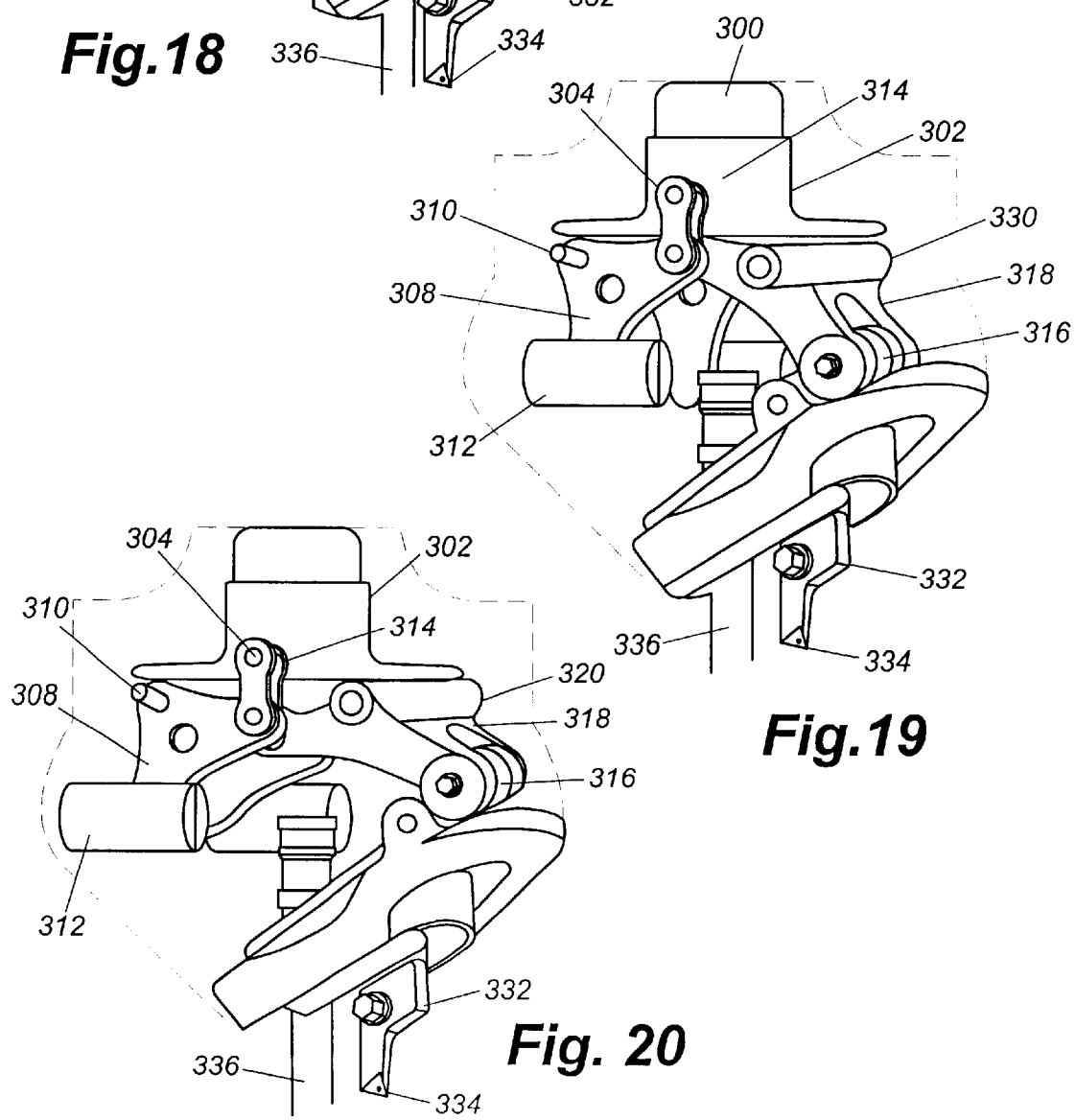
Fig.19
Fig. 20

CONTOUR MACHINING HEAD

RELATED APPLICATIONS

This application is a continuation-in-part of application Ser. No. 09/521,333, filed Mar. 9, 2000, now U.S. Pat. No. 6,382,883 B1 which is a continuation-in-part of application Ser. No. 09/153,766, filed Sep. 15, 1998, now issued as U.S. Pat. No. 6,086,293, which claims the benefit of priority to U.S. provisional application Ser. No. 60/081,481, filed Apr. 13, 1998. This application also claims the benefit of priority to U.S. provisional applications Ser. No. 60/195,671, filed Apr. 7, 2000, and U.S. Ser. No. 60/239,620, filed Oct. 11, 2000. The disclosure of each related application is incorporated herein by reference in its entirety.

BACKGROUND OF THE INVENTION

Machining of materials to create openings or recesses of different shapes is used in the manufacture and repair of a wide range of objects. In applications where the dimensional tolerances, roundness and smoothness of the machined surface are important, special tools are often required, especially when the material to be machined is very hard or otherwise difficult to machine. For example, transfer machines within an automated manufacturing line often require multiple machining heads with a variety of different cutting bits to form rounded openings of the desired profiles. The more different machining heads required in a transfer machine, the more complex the machine becomes, and the more floor space it requires. As an alternative to multiple machining heads, a single cutting machine can be adapted to receive a variety of different cutting bits. However, when the cutting bit needs to be changed, the processing line must be paused or shut down, resulting in reduced throughput.

In an exemplary application, such cutting tools are used in the repair of the cylinders heads of internal combustion engines to re-establish the high quality seal required for efficient engine performance and fuel consumption. It is well known among vehicle mechanics that valve seats can be machined to remove the outer surface of the seat to expose a smooth and uniform contact surface by a technique commonly referred to as "lapping". This lapping technique is accomplished by removing the cylinder head from the engine and machining the valve seats with a cutting blade. Typically, a valve seat has a profile with three different angles: a throat angle, a valve seat angle, and a top angle. In order to simultaneously cut the different angles, a "three-angle" cutting blade or bit is used. Each cutting edge of the three-angle cutting bit corresponds to one of the valve seat angles to be machined. Three-angle cutting bits vary in size and shape depending on the type of cylinder head valve seat being machined. These three-angle cutting bits are currently used by valve seat and guide manufacturers.

A disadvantage of the lapping technique is the risk of damage to the surface finish from vibration, chattering, or undulation generated by flexion of the cutting bits. This problem develops because certain cylinder head valve seat shapes require a three-angle cutting bit with a long cutting edge. Rotation of this long cutting edge when the edge is in contact with the work surface can create flexions in the cutting bit, especially when the material is difficult to machine, i.e., a very hard material. These flexions generate vibrations, chattering, or undulations which can disrupt contact between the cutting edge and the surface being cut. The skipping blade can damage the surface finish of the valve seat resulting in a machined valve seat that is not acceptable by Original Equipment Manufacturer (OEM) standards.

Another disadvantage of the lapping technique is a decentering phenomena. As stated above, cutting efforts with a long cutting edge/surface create flexions. These flexions create an unbalanced radial cutting effort which decenters the three-angle cutting blade, also resulting in unacceptable quality.

Still another disadvantage of the lapping technique is the large number of three-angle cutting blades needed to machine different types of valve seats. Each type of engine has a different valve seat profile. Thus, one or more unique three-angle cutting blades may be needed for each type of engine.

In view of the aforementioned inadequacies of the prior art, the need exists for a cutting tool and a method for machining rounded openings that produces a good quality finish and uses a universal cutting blade.

SUMMARY OF THE INVENTION

It is an advantage of the present invention to provide a universal cutting bit and bit holder having the ability to rapidly and precisely machine a wide range of openings or recesses of varied shapes and/or profiles.

It is also an advantage of the present invention to substantially reduce flexion of the cutting bit during machining.

It is another advantage of the present invention to eliminate decentering phenomena due to unbalanced radial efforts from flexion, and to eliminate concentricity defects resulting from cutting/machining effort.

Yet another advantage of the present invention is to eliminate vibrations, chattering, and undulations to provide improved finish for the machined surface.

Still another advantage of the present invention is to provide concentric machining for multiple contours within a opening.

In an exemplary embodiment, the present invention is a machining head of a machining apparatus comprising a spindle, a carriage head, a carriage head holder, a carriage feed driving assembly, and a universal cutting blade. A fixed pilot is attached to the bottom of the carriage head along the z-axis of a machine spindle to provide a means for centering the machining head in the opening to be machined, e.g., a valve guide of a cylinder head. The carriage head holder attaches to an extension of the machine spindle so that when the machine spindle is rotated, the machining head rotates. The carriage head is attached to the carriage head holder at an inclined angle relative to the bottom surface of the carriage head. The carriage feed driving assembly provides control of the inward and outward movement of the carriage head. The universal cutting blade is mounted on the carriage head through one of a plurality of mounting holes. For applications to cylinder head repair, the machining head can be utilized with virtually any conventional valve seat machining system, but is preferably used with the systems disclosed in U.S. Pat. Nos. 5,613,809, 5725,335, and 5,829, 928 of Harmand, et al. (hereinafter the '809, '335, and '928 patents, respectively) which are incorporated herein by reference.

The machining apparatus of the exemplary embodiment comprises a driving system, a machining head as described above, a pilot, a depth gauge, and a system controller. The driving system further comprises a machining sphere, a machine spindle, a spindle sheath, a rotational drive motor, and a vertical displacement motor. The spindle sheath is disposed within and supported by the machine sphere. The spindle sheath is fixed within the x-and y-axis, but can move along the z-axis by the vertical displacement motor. The vertical displacement motor is electrically connected and controlled by the system controller. The machine spindle is disposed within the spindle sheath and rotates around its z-axis through a drive motor. The drive motor rotating the machine spindle is electrically connected to and controlled by the system controller. The depth gauge is disposed on the spindle sheath by a fixed arm and is electrically connected to the system controller. The depth gauge measures the distance between a top surface of a cylinder head and the cutting blade. In a preferred embodiment, a second vertical displacement motor is provided so that feed of the arbor, which controls the carriage feed rate, is independent of the spindle feed which vertically moves the spindle, housing and all components therein relative to the working surface, providing three independent degrees of motion.

The system controller includes a memory which contains software for controlling the operation of the cutting tool. This system controller includes a user interface at which an operator can input the parameters that define the geometry of a valve seat profile. These parameters are used by the system controller to determine the vertical feed rate of the machine spindle, the length of the vertical displacement of the spindle to machine the segment, the inward/outward displacement of the carriage head, and the number of rotations needed to machine a segment of the valve seat profile. The system controller uses a look-up table, stored externally or within internal memory, and the input information is used to determine the vertical feed rate of the machine spindle, the length of the vertical displacement of the spindle to machine the segment, and the number of rotations needed to machine a segment of the valve seat profile. An operator simply centers the spindle, activates the system after the initial input of information for a given cylinder head and valve seat profile, and re-centers on each subsequent valve seat before activation.

For applications to transfer machines or other machining applications, the system controller coordinates operation of the machining head with the transfer of work pieces into a work station associated with the machining head. As with the embodiment for use for valve seat machining, the controller stores data including the parameters used to control the machining head to achieve the desired characteristics (profile, diameter, depth, finish smoothness, etc.) of the opening.

BRIEF DESCRIPTION OF THE DRAWINGS

Understanding of the present invention will be facilitated by consideration of the following detailed description of preferred embodiments of the present invention taken in conjunction with the accompanying drawings, in which like numerals refer to parts, and in which:

FIGS. 9 is diagrammatic side view of a method for machining valve seats;

FIG. 18 is a perspective view of the fourth embodiment extended in a first radial position;

FIG. 19 is a perspective view of the fourth embodiment extended in a second radial position;

FIG. 20 is a perspective view of the fourth embodiment extended in a third radial position;

DETAILED DESCRIPTION OF THE PREFERRED EMBODIMENT

The cutting tool for machining valve seats comprises a driving system with a z-axis adjustable spindle, a depth gauge, a pilot, a machining head, and a system controller. The method for machining a valve seat having any taper angle by utilizing a universal cutting blade can be described by simultaneously varying the height and cutting radius of the cutting tool. Cutting radius is defined as the distance from the cutting blade to the z-axis of the spindle. Thus, the invention can machine an unlimited number of different taper angles within a single valve seat profile by continuously varying both the z-axis of the spindle and the cutting radius of the cutting tool. Specifically, a valve seat taper angle can be described by varying only the z-axis feed rate of the spindle when the spindle rotation varies the cutting radius of the cutting tool through a gearing system. Alternatively, a valve seat taper angle can be machined by varying only the rotational speed of the spindle while the z-axis feed rate of the spindle remains constant. Another method of machining a valve seat taper angle is to utilize a z-axis feed rate of the cutting tool, a spindle rotation to rotate the cutting tool, and a means to vary the cutting radius that is independent of spindle rotation.

In a first embodiment of the invention, a machining head is attached to a spindle and rotated by a driving system. The machining head further comprises a carriage head holder, a pinion feed driving assembly, a fixed angle carriage head, and a universal cutting blade. A pilot is attached to the bottom surface of the machining head along the z-axis of the spindle. The carriage head is disposed at a fixed angle to the carriage head holder. The cutting radius of the carriage head varies through cooperation with the z-axis adjustable spindle and a gearing system. A universal cutting blade with one edge is disposed on one of a plurality of mountings on the carriage head.

A depth gauge is disposed on the driving system to aid the z-axis spindle feed rate adjustment by determining the height of the cutting blade relative to the valve seat. The z-axis spindle feed rate adjustment can be accomplished by manual means or control means well-known to one of ordinary skill in the art such as a computer, a logic gate array, or a dedicated microprocessor.

Figure 1:
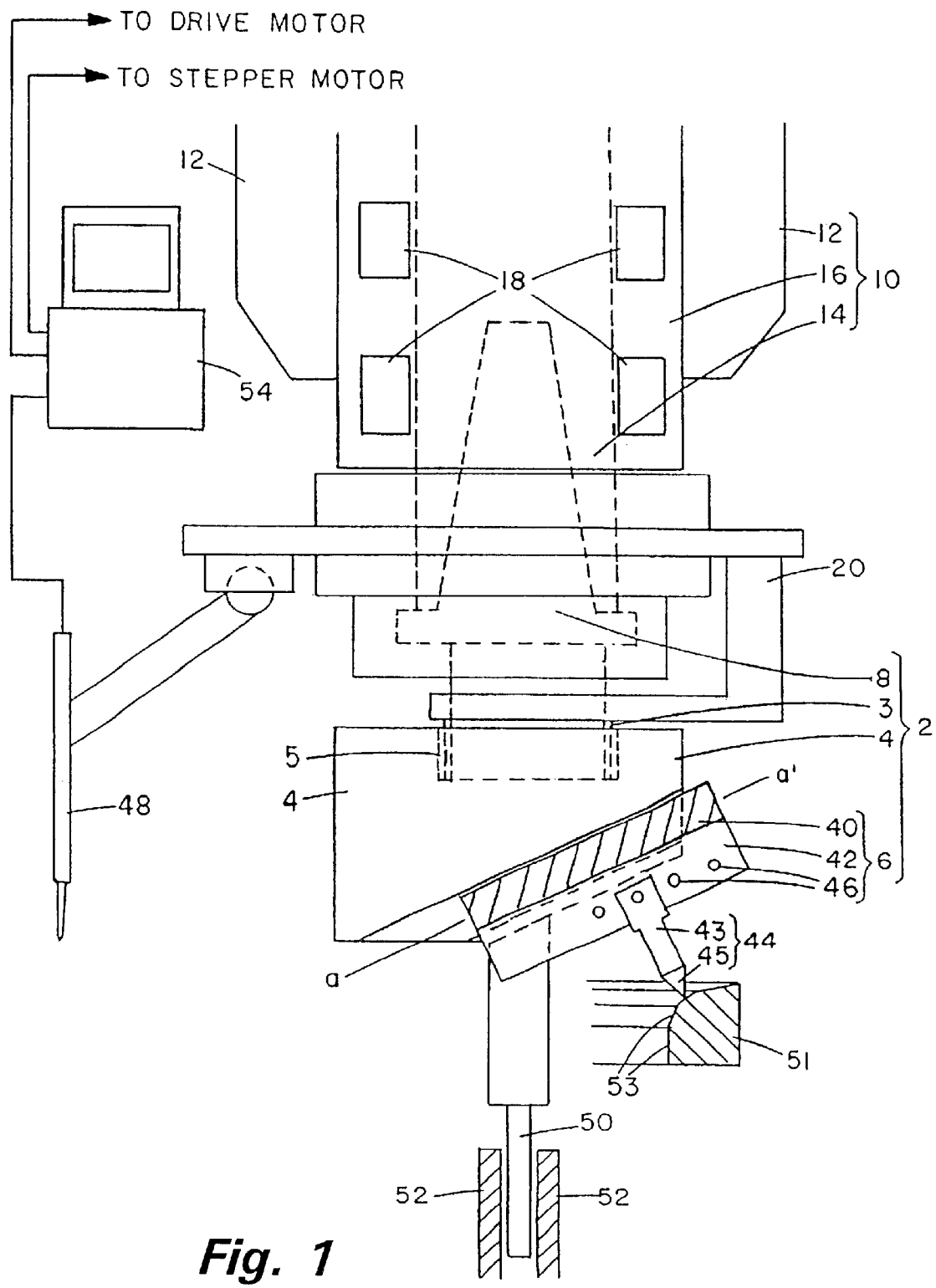
FIG. 1 is a diagrammatic front view of the cutting tool of a first embodiment.

In a first embodiment of the invention, as illustrated in FIG. 1, a driving system 10 comprises a drive motor (not shown), a transmission linkage (not shown), a stepper motor (not shown), a machine sphere 12, a machine spindle 14, and a spindle sheath 16 having an upper end and a lower end. The upper end of spindle sheath 16 is disposed within machine sphere 12 which provides support for spindle sheath 16. Alternatively, spindle sheath 16 can be supported by any conventional means known in the art such as a pantograph or multi-jointed arms. Spindle sheath 16 is mounted within machine sphere 12 which provides angular adjustment of spindle sheath 16. The framework (not shown), within which machine sphere 12 is supported, provides small x-y adjustment. Spindle sheath 16 can move along the z-axis by any conventional translation means such as a stepper motor. The stepper motor is electrically connected to a system controller 54 which controls the stepper motor. Alternatively, spindle sheath 16 can be translated manually, or by other known mechanical means along the z-axis. Machine spindle 14 has a distal end and is disposed within spindle sheath 16. Machine spindle 14 has an inside wall forming a cavity near its distal end adapted for connection to machining head 2. A plurality of spindle bearings 18 allows machine spindle 14 to rotate around its z-axis. Machine spindle 14 is rotated by a drive motor through any conventional means such as transmission linkage, direct connection, or universal joint linkage. The machine spindle 14 of a preferred embodiment is rotated by a drive motor through a transmission linkage. The drive motor, which rotates machine spindle 14, is electrically connected to system controller 54 which controls the drive motor.

Figure 2:
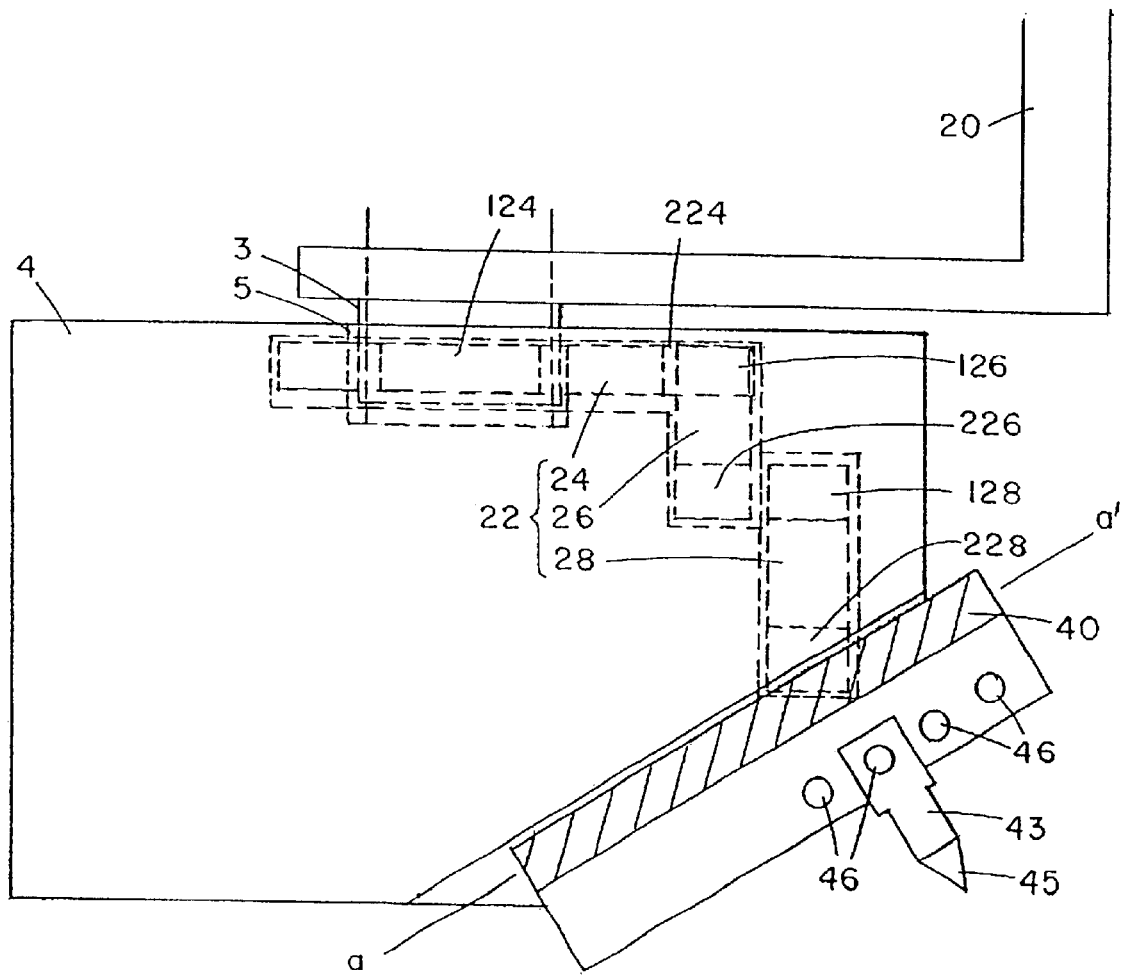
FIG. 2 is a diagrammatic front view of the machining head of the cutting tool a first embodiment.

Referring to FIGS. 1 and 2, machining head 2 comprises a taper adapter 8, a fixed sleeve 3, a carriage head holder 4, a pinion feed driving assembly 22, a carriage head 6, and a universal cutting blade 44. Taper adapter 8 has an upper portion, a middle portion, and a lower portion. The upper portion of taper adapter 8 is adapted to cooperate with the cavity near the distal end of machine spindle 14 so that taper adapter 8 is rotated by machine spindle 14. The lower portion of taper adapter 8 is attached to carriage head holder 4 so that when machine spindle 14 is rotated, carriage head holder 4 also rotates.

Carriage head holder 4 has a top portion having a cavity 5. Cavity 5 further includes a ball bearing or needle bearing 38 to receive fixed sleeve 3 and machine spindle 14. Machine spindle 14 extends through fixed sleeve 3 to attach to the bottom of cavity 5 for transmitting the rotation movement of the spindle 14 to the machining head 2. Fixed sleeve 3 does not rotate or move relative to spindle sheath 16.

Fixed sleeve 3 is attached to spindle sheath 16 through means well-known to one of ordinary skill in the art such as a support arm 20. Support arm has a vertical portion and a horizontal portion. The vertical portion of support arm 20 has a top end and a bottom end wherein the top end is attached to the lower end of spindle sheath 16. The horizontal portion of support arm 20 has a proximal end and a distal end wherein the proximal end is attached to the bottom end of the vertical portion of support arm 20. The distal end of support arm 20 is attached to fixed sleeve 3.

Figure 3:
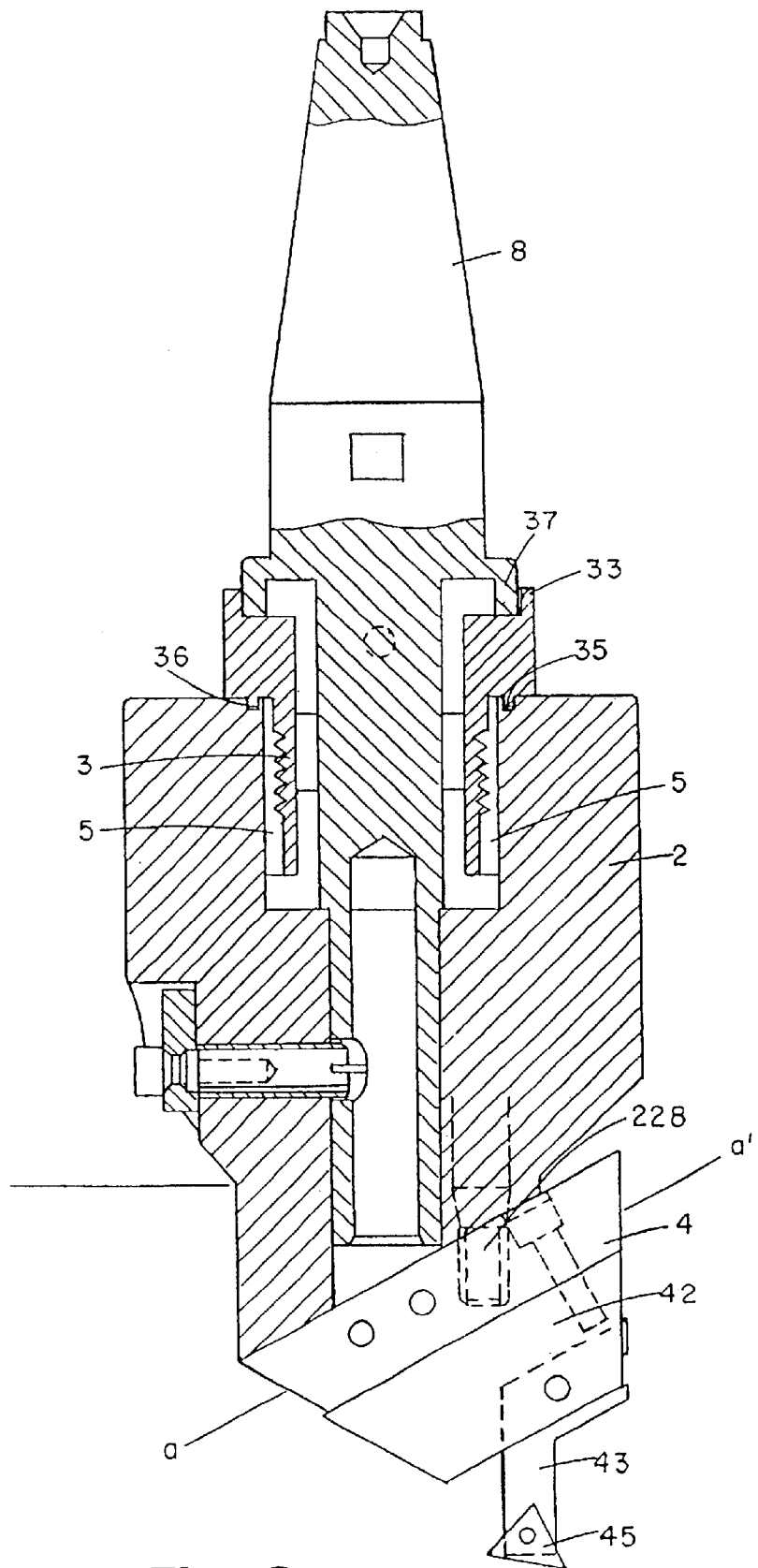
FIG. 3 is a front view, partially cut away, of the machining head and spindle a first embodiment.
Figure 4:
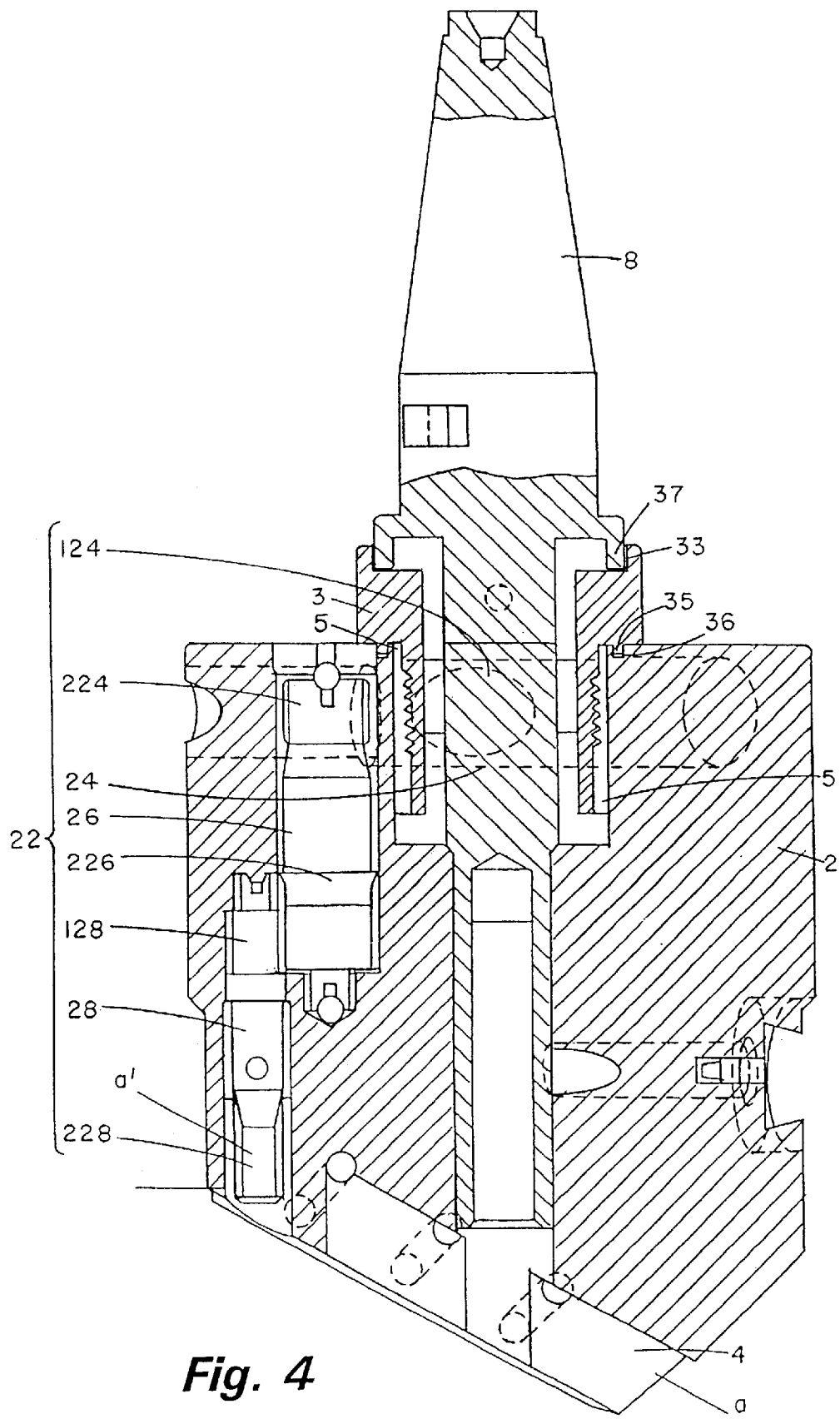
FIG. 4 is a side view, partially cut away, of the machining head, showing the pinion drive gearing system a first embodiment.

Referring to FIG. 3 and FIG. 4, taper adapter 8 is adapted to rotate freely within fixed sleeve 3. Fixed sleeve 3 has a top portion and a bottom portion. The top portion of fixed sleeve 3 has an upward annular flange 33 extending upward, and a downward annular flange 35 extending downward. The middle portion of taper adapter 8 has an annular flange 37 extending slightly downward. Upward annular flange 33 has a slightly larger diameter than annular flange 37 and interfits with annular flange 37 to help prevent grease from coming out and outside dirt, e.g., metal shavings and dust, from penetrating directly into bearing 38. Downward annular flange 35 mates with an annular channel 36 on the top surface of carriage head holder 4 to help provide additional stability along the x- and y- axis. Annular flange 35 and annular channel 36 also prevent grease from escaping and outside contaminants such as metal shavings and dust from penetrating directly into bearing 38. The lower portion of fixed sleeve 3 is threaded and disposed within cavity 5 formed on the top of carriage head holder 4. The thread on the bottom portion of fixed sleeve 3 is adapted to cooperate with a pinion feed driving assembly 22 as shown in FIG. 4.

Fixed pilot 50, as shown in FIG. 1, attaches to the bottom surface of carriage head holder 4 so that fixed pilot 50 is aligned along the z-axis of machine spindle 14. Fixed pilot 50 fits closely within a valve guide 52 of an engine cylinder head to aid in centering machining head 2. Selection of an appropriate pilot is within the level of skill in the art.

Figure 5:
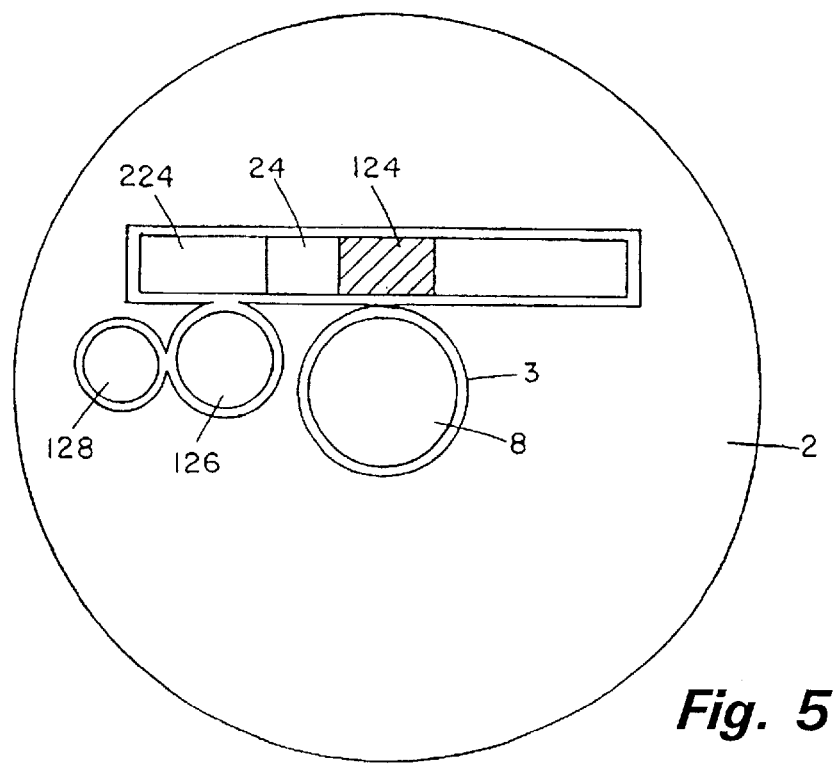
FIG. 5 is a diagrammatic top view, partially cut away, of the machining head, showing the pinion feed driving assembly a first embodiment.

Referring to FIGS. 2 and 5, pinion feed driving assembly 22 comprises a geared horizontal member 24, a pinion arbor 26, and a geared vertical member 28. Carriage head holder 4 has interior walls forming three bores which are slightly larger than pinion feed driving assembly 22. These bores within carriage head holder 4 are adapted to support pinion feed driving assembly 22 and to allow the members of the pinion feed driving assembly 22 to rotate freely within the bores of carriage head holder 4.

Geared horizontal member 24 comprises a proximal gear 124 and a distal gear 224. Geared horizontal member 24 has a proximal end and a distal end. Proximal gear 124 is attached to the proximal end of geared horizontal member 24 and is adapted to cooperate with the thread on fixed sleeve 3 so that when machining head 2 is rotated, geared horizontal member 24 rotates. Distal gear 224 is attached to the distal end of geared horizontal member 24 and is adapted to cooperate with and rotate pinion arbor 26. Pinion arbor 26 comprises a first gear 126 and a second gear 226. Pinion arbor 26 has a top end and a bottom end. First gear 126 is attached to the top end of pinion arbor 26 and second gear 226 is attached to the bottom end of pinion arbor 26. First gear 126 is adapted to cooperate with distal gear 224. Second gear 226 is adapted to cooperate with geared vertical member 28. Geared vertical member 28 comprises a top gear 128 and a bottom gear 228. Top gear 128 is attached to geared vertical member 28 to the end closest to pinion arbor 26. Top gear 128 cooperates with second gear 226 so that when pinion arbor 26 is rotated, geared vertical member 28 rotates. Bottom gear 228 is attached to geared vertical member 28 to the end farthest to pinion arbor 26. Bottom gear 228 cooperates with carriage head 6 so that when geared vertical member 28 is rotated, carriage head 6 moves along line a–a'. A number of configurations for pinion feed driving assembly 22 are well known, and a person of ordinary skill in the art would recognize that alternative gear assemblies may be used to provide the desired movement.

As shown in FIGS. 1 and 2, carriage head 6 further comprises a toothed rack 40 and a cutting blade holder 42. Carriage head 6 is slidably attached to carriage head holder 4 at an inclined angle relative to the bottom surface of carriage head holder 4. Toothed rack 40 cooperates with geared vertical member 28 so that carriage head 6 is moved along line a–a' when geared vertical member 28 is rotated. The outward movement of carriage head 6 along line a–a' increases the cutting radius of carriage head 6. Cutting radius is defined as the radial distance from a cutting blade 44 to the z-axis of the machine spindle 14. Likewise, the inward movement of carriage head 6 along line a–a' decreases the cutting radius. Thus, the rotation of machine spindle 14 provides rotational movement for carriage head holder 4 and linear movement along line a–a' for carriage head 6 through pinion feed driving assembly 22. The movement of carriage head 6 along line a–a' can be accomplished through other conventional means known to one of ordinary skill in the art such as a belt and pulley configuration.

Cutting blade holder 42 provides means for mounting a cutting blade 44. A variety of mounting means are well-known in the art such as nut-bolt and screw-thread configurations. In the preferred embodiment, cutting blade holder 42 has a surface defining a plurality of mounting holes 46. Cutting blade 44 can be mounted to any one of the plurality of mounting holes 46 to provide larger scale adjustment of the cutting radius by varying the starting point of cutting tip 45.

Cutting blade 44 has a proximal end and a distal end. Cutting blade 44 comprises mounting surface 43 on the proximal end and cutting tip 45 on the distal end. Cutting tip 45 has one edge. Alternatively, cutting tip 45 can have a plurality of edges. Mounting surface 43 is disposed on cutting blade holder 42 through any one of the plurality of mounting holes 46.

As shown in FIG. 1, depth gauge 48 is disposed on the spindle sheath 16 by a moveable arm or by any conventional means known in the art such as clamps or solder. Depth gauge 48 can be a linear gauge which contacts the surface of the cylinder head for measuring the distance between a valve seat and cutting blade 44. Other means for measuring distance may be used, as are known in the art, including optical measurement techniques, e.g., lasers. Depth gauge 48 is electrically connected to a system controller 54 to provide feedback for control of feed rate and depth. Alternatively, depth gauge 48 can be connected to an output display.

System controller 54 includes memory and programming for controlling the operation of the cutting tool. System controller 54 can be any control means well-known to one of ordinary skill in the art such as a computer, a transputer, a logic gate array, or a dedicated microprocessor. Preferably, system controller 54 is a computer with a touch-screen display. Other operator interfaces may be used including keypads or smart card readers. An operator can input the parameters that define the geometry of the valve seat profile. System controller 54 uses these parameters to determine the vertical feed rate for machine spindle 14, the length of the vertical displacement of machine spindle 14 to machine the segment, and the number of rotations needed to machine a segment of the valve seat profile. With such information in memory, the operator intervention is minimal including centering machine spindle 14 and selecting the appropriate valve seat profile. For example in a typical machining process of the preferred embodiment, the operator enters the type of engine to be machined into system controller 54. The system controller 54 uses a look-up table stored externally or within internal memory and the input information to determine the number of rotations and the vertical feed speed of machine spindle 14 in order to bring the valve seats within OEM specifications or to meet other desired specifications. The operator simply needs activate the system after the initial input of the appropriate information for the subject cylinder head. The machine spindle 14 is automatically centered and re-centered on each subsequent valve seat before activation. The system controller can use either internal memory or external memory such as "smart card" or a memory card.

In an embodiment using a memory card, each memory card is dedicated to a single cylinder head, or family of cylinder heads such that, by inserting the memory card into a memory card reader, the specific parameters of a particular machining task is loaded into system controller 54. This ensures that the cutting tool operator, regardless of experience level or personal preferences, will machine the cylinder head according to the specifications stored on the memory card. Because of the ease of programming and reading the memory card, particular customers may wish to have their own dedicated memory card. For example, a memory card can be programmed for each family of cylinder heads of specific car manufactures to store the optimum machining characteristics for each.

In another embodiment, the memory card can also have dimensional specifications and/or set-up parameters selected and stored by the vehicle manufacturer in addition to the set-up parameters stored by the operator. The memory card of this embodiment ensures that machining is uniform from engine to engine of the same type in accordance with the manufacturer's specifications. In addition, the pre-programmed memory card can facilitate repairs where a repair shop services a large number of the same make and model of a given vehicle.

The memory card, commonly called a "smart card" or "token smart card" is available from different manufacturers worldwide. (See, e.g., Bright, Smart Cards: *Principles, Practice, Applications*, Hoisted Press, 1988.) Such cards use either a programmable microchip or a magnetic strip on its back side to store information. The memory card device is a commercially available card reader which is electronically interfaced to system controller 54. Thus, once the memory card is inserted into the card reader, the digital information which is stored on the card is retrieved by system controller 54 to automatically set up the machining of the cylinder head. As this method of storing information is common in other fields, the details of the particular method of encoding and decoding the digital information from the memory card is not discussed here.

The method for machining valve seats may be used for machining valve seats of virtually any shape using a universal cutting blade. The only limitation is that the radius of the valve seat must fit within minimum and maximum allowable positions of carriage head 6, as shown in FIG. 1. The method comprises coordinating the feed rate of the z-axis translation of machine spindle 14 with the cutting radius of carriage head 6. Although coordination may be accomplished manually, coordination through system controller 54 is preferred.

Figure 8:
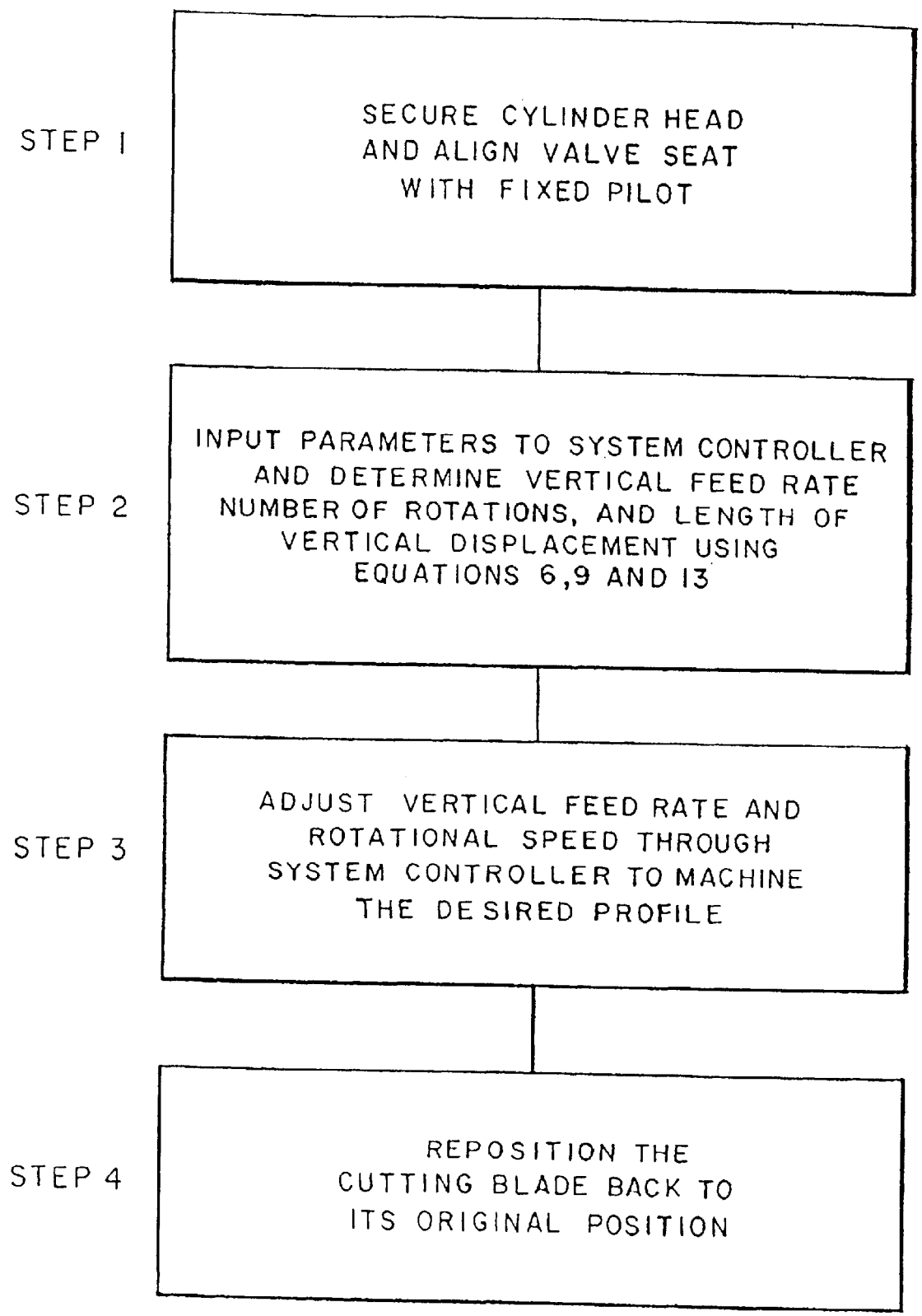
FIG. 8 is a block diagram showing the steps of the method for machining valve seats in accordance with the first embodiment.

Referring to FIG. 8, the method for machining valve seats comprises four steps. First, a valve seat is centered using the fixed pilot of the cutting tool. Second, the vertical feed rate, the length of the vertical displacement of machine spindle 14 to machine the segment, and the number of rotations for each segment of the valve seat profile are calculated by system controller 54 from input parameters of the valve seat profile. Third, system controller 54 adjusts the vertical feed rate of machine spindle 14 to cut each segment according to the desired valve seat profile. Fourth, system controller 54 returns the cutting blade to its original position.

In the first step, a cylinder head valve seat is secured into position beneath machining head 2 through any conventional means known to one of ordinary skill in the art such as a stand with adjustable multi-direction clamps. The cylinder head is positioned so that valve guide 52 is aligned with both fixed pilot 50 and the z-axis of machine spindle 14. This alignment can be accomplished by a number of techniques known to one of ordinary skill in the art such as adjusting the position of the cylinder head or machining head 2.

In the second step, the parameters that define the geometry of the profile of the valve seat are input to system controller 54 by an operator. The parameters can be input directly using Cartesian coordinates (x,y) or polar coordinates (length, angle). Alternatively, the parameters can be retrieved from a pre-established database of valve seat profiles that are stored in internal memory such as a hard disk drive, or external memory such as a "smart card". Once the valve seat profile is input, system controller 54 decomposes the valve seat profile into a number of segments. The vertical feed speed and direction of machine spindle 14 is computed for each of these segments according to the number of rotations needed and the angle of the segment. The starting and finishing points are the length of the segment and the coordinates of the preceding segment. The programming of system controller 54 is derived from the configuration of the cutting tool, the input parameters, and trigonometry.

A formula to determine the vertical feed per revolution of machine spindle 14 for each segment can be calculated from the feed per revolution of the carriage according to its inclination angle, the angle of carriage with respect to the horizontal, and the angle of the segment.

Figure 6:
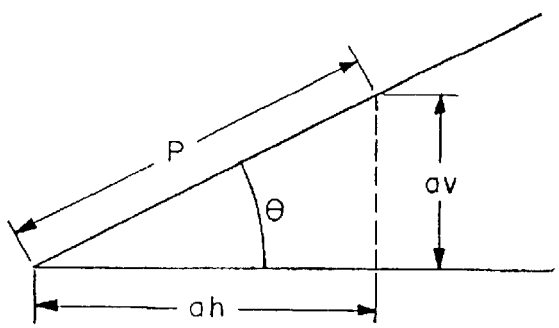
FIG. 6 is a geometrical representation of the feed per revolution of the carriage head according to its inclination angle a first embodiment.

Referring to FIG. 6, where:

P=feed per revolution of the carriage according to its inclination angle;

ah=horizontal feed per revolution of the carriage;

av=vertical feed per revolution of the carriage; and

θ=angle of the carriage with respect to the horizontal.

The values for ah and av are calculated according to simple trigonometric functions for the base and height of a right triangle.

$$ah = P^* \cos \theta \qquad (1)$$

$$av = P^* \sin \zeta \qquad (2)$$

Figure 7:
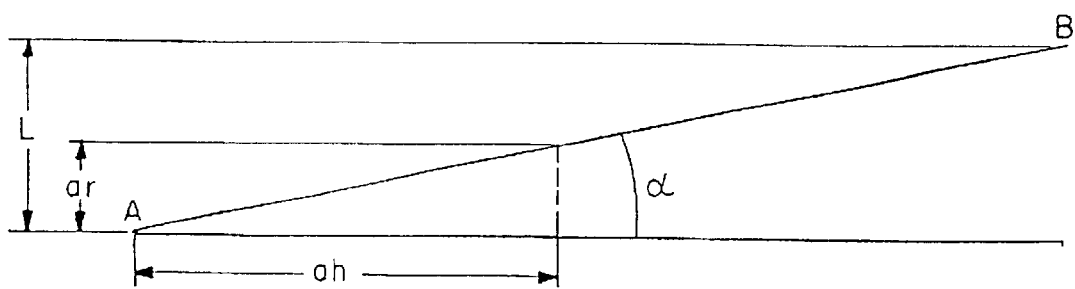
FIG. 7 is a geometrical representation of a segment length of a valve seat profile of a first embodiment.

Referring to FIG. 7, where:

AB=segment length;

α=angle of the segment;

L=vertical projection of the segment; and ar=resulting feed per revolution due to the feed rate of the carriage and to the vertical movement of machine spindle 14.

The value for ar is derived according to the simple trigonometric function:

$$ar = ah^* \tan \alpha \qquad (3)$$

Now, substituting for ah using equation (1):

$$ar = P^* \cos \theta^* \tan \alpha \qquad (4)$$

The vertical feed per revolution of machine spindle 14, F, can be determined using ar and av. By definition:

$$ar = av + F \qquad (5)$$

where,

F=vertical feed per revolution of machine spindle 14.
Now, rearranging Equation 5 and substituting for ar and av from Equations 4 and 2:

$$F = ar - av$$

$$F = P(\cos \theta^* \tan \alpha - \sin \theta) \qquad (6)$$

The number of rotations that machine spindle 14 must complete to machine the segment, N, and the length of the vertical displacement of machine spindle 14 to machine the segment, d, can be determined from AB, α, and θ.

N=number of rotations that machine spindle 14 must complete to machine the segment d=length of the vertical displacement of machine spindle 14 to machine the segment By definition:

$$L = ar^* N \qquad (7)$$

Using the trigonometric relationship:

$$L = AB^* \sin \alpha \qquad (8)$$

Substituting for ar using equation (4):

$$N = L/ar = (AB^* \sin \alpha)/(P^* \cos \theta^* \tan \alpha)$$

Thus, $$N = (AB^* \cos \alpha)/(P^* \cos \theta) \qquad (9)$$

By definition, $$d = F * N \tag{10}$$

Substituting for F and N using equation (6) and (10)

$$d = P(\cos\theta * \tan\alpha - \sin\theta) * (AB * \cos\alpha)/(P * \cos\theta) \tag{11}$$

Rearranging equation (12):

$$d = [AB/\cos\theta] * [\cos\alpha(\cos\theta * \tan\alpha - \sin\theta)] \tag{12}$$

Expanding equation (13):

$$d = [AB/\cos\theta] * [(\cos\alpha * \cos\theta * \sin\alpha/\cos\alpha) - (\cos\alpha * \sin\theta)]$$

$$d = [AB/\cos\theta] * [\cos\theta * \sin\alpha - \cos\alpha * \sin\theta]$$

Substituting the trigonometric identity of $\sin(x-y) = \sin x * \cos y - \cos x * \sin y$:

$$d = [AB/\cos\theta] * \sin(\alpha - \theta) \tag{13}$$

Thus, given a segment length, AB, and the angle of the segment, α, system controller 54 can calculate F (the vertical feed per revolution (vertical feed rate) of machine spindle 14, N (the number of rotations that machine spindle 14 must complete to machine the segment), and d (the length of the vertical displacement of machine spindle 14 to machine the segment).

In the third step shown in FIG. 8, system controller 54 uses the values calculated from the operator input parameters as shown in Equations 6, 9, and 13 to adjust cutting blade 44 to machine the desired profile. The operation of carriage head 4 along line a–a' of FIG. 1 relies on the rotation of machine spindle 14 through pinion feed driving assembly 22. The a–a' movement depends only upon the number of rotations machine spindle 14 goes through, as opposed to the speed of rotation or the movement of the z-axis spindle. The coordination of the movement of the z-axis and the cutting radius can machine any shape valve seat.

A number of methods can be used to accomplish valve seat machining. In a preferred method of the first embodiment the vertical feed rate of machine spindle 14 is adjusted for each segment while the rotational speed of machine spindle 14 is kept constant. In another embodiment, the vertical feed rate is constant and the rotational speed of machine spindle 14 varies. In another machining method, system controller 54 can vary both the vertical feed rate and the rotational speed of machine spindle 14 to machine the desired profile.

In a preferred embodiment of the third step, the combination of machine spindle 14, carriage head 6, depth gauge 48, and fixed pilot 50 works with system controller 54 to machine any desired pattern. An operator centers the valve seat with fixed pilot 50 which fits closely within the valve guide 52 of the engine cylinder head. System controller 54 uses the input parameters from the operator and inputs from depth gauge 48 to control vertical feed rate of machine spindle 14. Machine spindle 14 rotates carriage head 6 which rotates cutting blade 44. As machine spindle 14 is rotated, the cutting radius increases or decreases because carriage head 6 is moved outward or inward along line a–a'. This movement is caused by the combination of fixed sleeve 3 cooperating with pinion feed driving assembly 22 which cooperates with toothed rack 40.

Depth gauge 48 contacts the surface of the cylinder head and produces an electrical signal indicative of surface distance. This signal is provided to system controller 54, which may be a dedicated microprocessor or a main system computer with a touch screen display. The system controller 54 then provides a command to a vertical translation means, such as a stepper motor, to correctly go to the reference point used as the beginning point from which the desired profile is machined.

Referring to FIG. 9, the initial position of cutting blade 44 is the same for each valve seat 55 to be machined within cylinder head 51. In a preferred embodiment, the initial position of cutting blade 44 is the point radially closest to the radial center of the valve seat, and each valve seat is machined from its innermost radial point to its outermost radial point. To create the different radii or facets 53a,b,c of a three facet valve seat profile, the vertical feed rate is varied to move the cutting blade 44 at the desired facet angle according to the relationships provided in Equations 6, 9, and 13. The cutting blade 44 is shown positioned after completing the first radius or facet "c". This example is not intended to be a limitation on the invention and one of ordinary skill in the art would recognize alternative methods. For example, the initial position of cutting blade 44 may be at the outermost radial point of the valve seat while the carriage head cutting radius moves inward. Alternatively, the initial position of cutting blade 44 can be anywhere along the radius of the valve seat while system controller 54 first machines outwardly, then returns to the initial position to machine inwardly.

In a preferred embodiment the machining head 2 is also capable of machining curves. Each curve segment is decomposed into as many straight lines as necessary for a desired surface contour. Each straight line segment then corresponds to at least one rotation of the machining head for a circular interpolation.

In a preferred embodiment, following completion of a final radius, system controller 54, as shown in FIG. 1, moves cutting blade 44 back to its original position by translating the z-axis of machine spindle 14 to its original height. System controller 54 then returns carriage head 6 to its original cutting radius by rotating machine spindle 14 in reverse by the exact number of rotations used to machine the entire valve seat. In another embodiment that is not as efficient in the number of steps, carriage head 6 can be disengaged and the z-axis of machine spindle 14 raised to higher than the original height. Then, machine spindle 14 is rotated in reverse by the exact number of rotations used to machine the entire valve seat and machine spindle 14 is lowered back to its original height. The method of returning the cutting blade 44 back to its original position may be accomplished by various methods, and one of ordinary skill in the art would recognize alternative methods to accomplish the same result.

The present invention utilizes a single universal cutting blade for any shape valve seat. This aspect of the invention is significant because prior art systems must use a different cutting blade for each type of valve seat shape. It is common for a prior art system to require over one hundred different cutting blades to machine a large range of cylinder heads. The use of a single cutting blade saves time for machining different valve seats because the cutting blade does not have to be replaced each time a new valve seat shape is encountered. Also, the cost of obtaining many different types of cutting blades is reduced to the cost of a single universal cutting blade.

The system of the present invention further provides a smaller cutting blade. The overall cutting surface of the smaller cutting blade is smaller than a three-angle cutting blade because the smaller cutting blade has only one edge or angle. Because a smaller cutting blade has a smaller cutting surface, flexion during cylinder head valve seat machining is greatly reduced, and in turn, vibrations, chattering, and undulations are reduced. A smaller cutting blade also prevents a de-centering phenomena due to unbalanced radial efforts from flexion. Thus, the inventive system provides reliable and repeatable means for machining a valve seat of virtually any shape.

The method of machining a valve seat of a cylinder head 51 of the first embodiment as shown in FIG. 1 includes the steps of rotating the spindle 14 which is driven by the center of the spindle, feeding the tool holder carriage 6 outward or inward utilizing the rack and pinion feed driving assembly 22 as shown in FIG. 2, and vertically displacing the spindle 14 which is driven by a precision screw that is built into a spherical sheath and motor affixed on the top of the spindle 14. Since the spindle assembly 1 is driven from a fixed point on the spindle sheath 16 and by the rotation of the spindle 14, the feed movement of the carriage 6 along feed line a–a' cannot be disengaged form the rotation movement of the spindle 14. As shown in FIG. 9, this system provides a means for machining a variety of valve seat shapes 55 including concave and convex facets, wherein the facets 53a,b,c may be machined up to approximately eighty degrees with respect a vertical axis along the center of the spindle 14. The facet angle is limited depending upon the acceptable surface finish and the fixed feed rate per revolution of the carriage 6.

Figure 10:
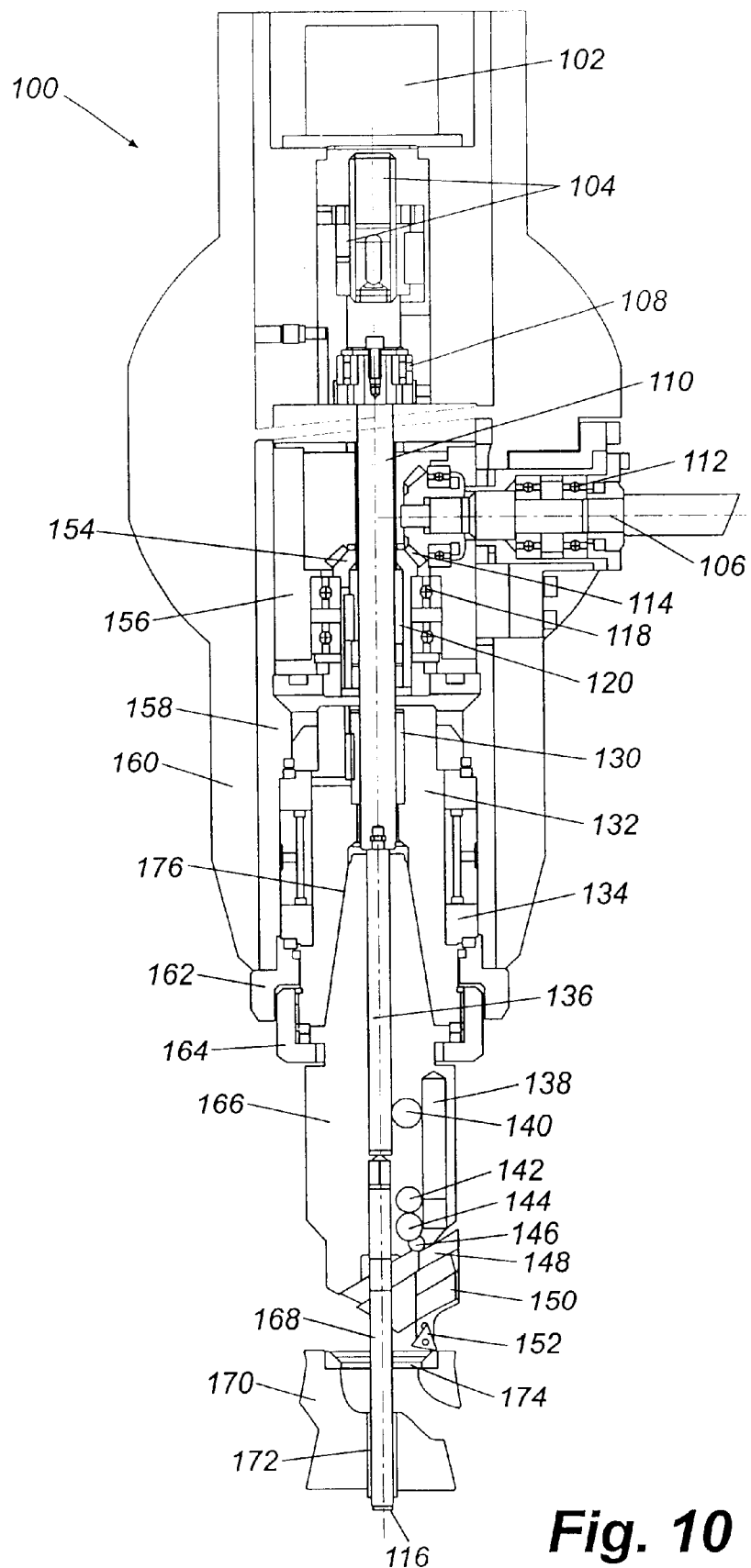
FIG. 10 is a diagrammatic side view of a second embodiment of the present invention wherein the feed movement of the carriage can be disengaged from the spindle rotation.

FIG. 10 shows a second embodiment of the spindle assembly 100 of the present invention. The valve seat 174 is machined by a cutting tool 152 working on an independently controlled inwardly/outwardly moving tool holder carriage 150. The second embodiment machines the cylinder head 170 valve seat 174 by dissociating the feed of the carriage 150 with respect to the rotation of the spindle 132. In contrast to the first embodiment as shown in FIG. 1, the second embodiment provides unlimited machining possibilities including cylindrical bores that are coaxial with the axis of the spindle 132. In addition, spindle assembly 100 has a capability of machining inwardly and outwardly within the same machining cycle.

Referring to FIG. 10, the independent movement of the tool carriage 150 is accomplished using a separate driver from the mechanism which drives the rotation of the spindle 132. In a preferred second embodiment a stepper motor 102 is utilized to control the feed of the tool holder carriage 150. The stepper motor 102 drives a ball screw assembly 104 including a ball screw and a cooperating nut for translating the rotational movement of the stepper motor 102. The combination stepper motor 102 and ball screw assembly 104, attached to the proximal end of arbor 110, permits arbor 110 to move vertically along the machine head axis 116. Arbor 110 is linked to axial control rack 136 at the distal end of arbor 110. As the axial control rack 136 is raised or lowered by stepper motor 102 control, the vertical movement is translated through a first pinion 140 to the carriage feed control rack 138. Lead/drive pinions 142,144, and 146 in turn, move the tool holder carriage 150 along axis a–a' as shown in the first embodiment of FIG. 1.

The arbor 110 for controlling the movement of the tool holder carriage 150 also drives the rotation of the tool holder spindle 132. The rotation of the arbor 110 is driven by drive motor (not shown) and transmission linking assembly 106. The transmission linking assembly 106 is connected to cone-shaped leading pinion 114. Support bearings 112 are fixed within spherical housing 160 and serve to stabilize the linkage section 106. Leading pinion 114 cooperates with a cone-shaped driven pinion 154 and a first and second arbor nut 120,130 to transfer rotational force from arbor 110 for rotating tool holder spindle 132. Spindle support bearing sets 118 are contained within a spindle driving pinion set enclosure 156 formed within the spherical housing 160 to guide the driven pinion 154 and do not move with the spindle 132. Spindle bearing sets 134 are held in position by bearing lock nuts 162 and serve to further stabilize the spindle 132 to ensure uniform concentric rotation. The spindle 132, the arbor 110, and related bearings are enclosed within a spindle sheath 158 that is situated within the sheath holding sphere 160. The sphere 160 is rotatable within a machining apparatus, such as the apparatus disclosed in the '809 patent until the machine head axis 116 and a spindle centering pilot 168 are aligned with the valve guide 172 of the valve seat 174.

A valve seat machining head 166 fits into a recessed area 176 in the tool holder spindle 132 and extends below the spindle sheath 158 and sheath holding sphere 160 along the machine head axis 116. Tool locking nuts 164 secure the machining head 166 to the tool holder spindle 132. The valve seat machining head 166 is centered on the machine head axis 116 at the distal end of the arbor 110 and includes the axial control rack 136, the carriage feed control rack 138, the pinion set for the tool holder carriage feed drive 140,142, 144,146, the tool holder carriage rack 148, the tool holder carriage 150, and the spindle centering pilot 168. A variety of cutting tools 152 required by machining specifications are attachable to the tool holder carriage 150.

The spindle assembly 100 of the second embodiment provides the means for a cutting tool 152 to make all the shapes necessary to manufacture and/or repair cylinder heads 170. Concave, convex, and vertical machining, such as any machining that is coaxial to and concentric with valve guides 172, are possible utilizing the independently controlled tool holder carriage 150. The second embodiment 100 of FIG. 10 can be utilized to machine valve seats 174 that are perfectly concentric with the axis of reference 116, i.e. the valve guide 172. Cylindrical machining is useful for a variety of fixtures including valve spring tappet housings, pre-combustion chamber housings, and valve spring pockets. This invention is particularly useful for valve seat machining when incorporated within a spindle having a spherical housing and movable support frame, i.e., a small x,y axis, such as described in the '809, '335, and '928 patents.

The method of machining a valve seat 174 of a cylinder head 170 of the second embodiment as shown in FIG. 10 includes the steps of rotating the spindle 14 utilizing a driving motor (not shown), feeding the tool holder carriage 150 outward or inward utilizing a carriage control mechanism 102 cooperating with the tool holder carriage feed rack 136, 138 and the associated pinion set 140, and vertically displacing the spindle assembly 100. The carriage control mechanism of the preferred method of the second embodiment is a stepper motor 102 and ball screw assembly 104,108. Upon completion of the machining process, the universal cutting tool 152 re-positionable to an initial position by operating the carriage control mechanism 102 to feed the carriage tool inward or outward to the initial position, or by controlling the carriage control mechanism 102 in combination with vertically displacing the spindle assembly 100.

Figure 11:
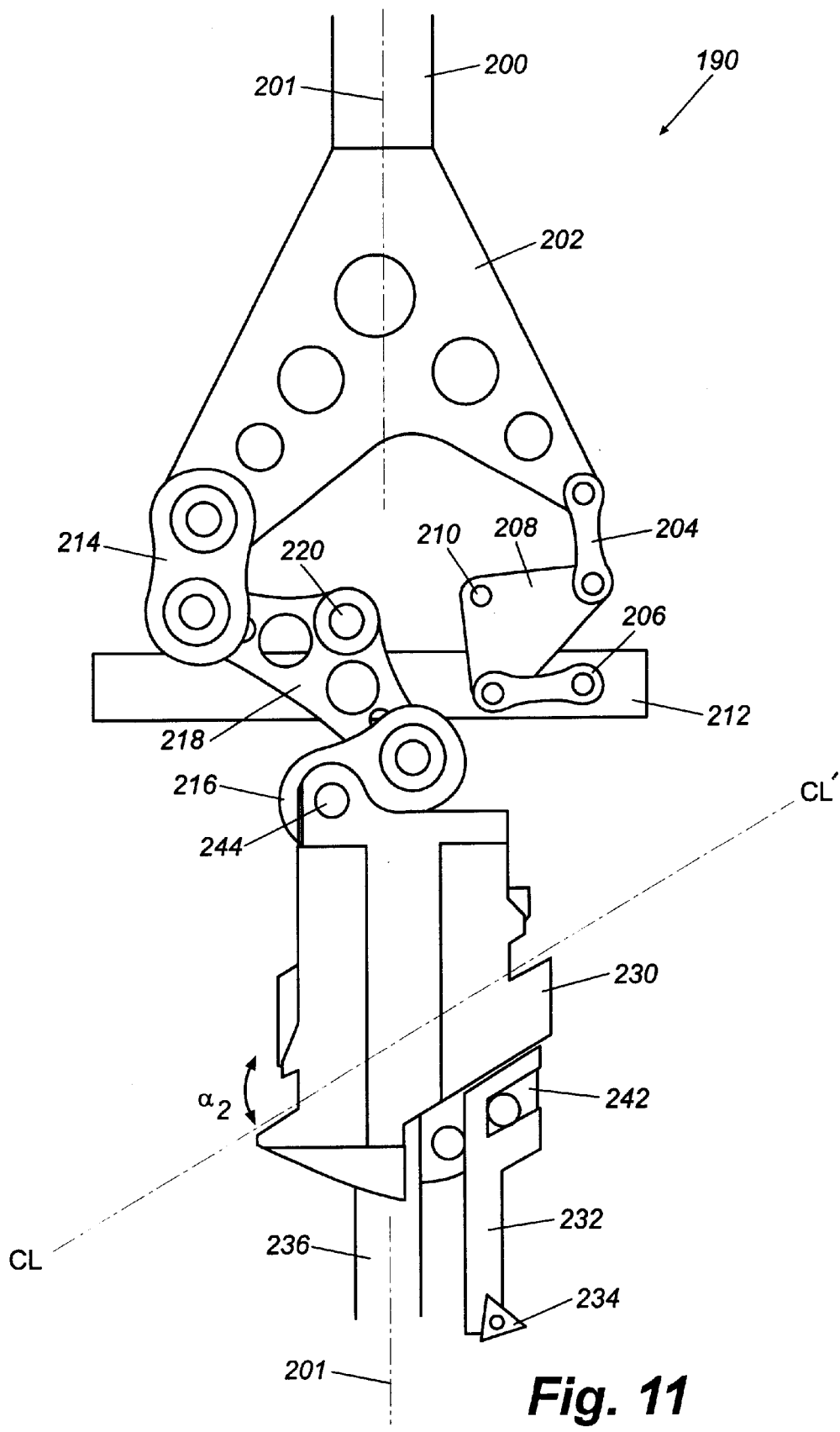
FIG. 11 is a diagrammatic side view of a contour head of a third embodiment of the present invention.
Figure 12:
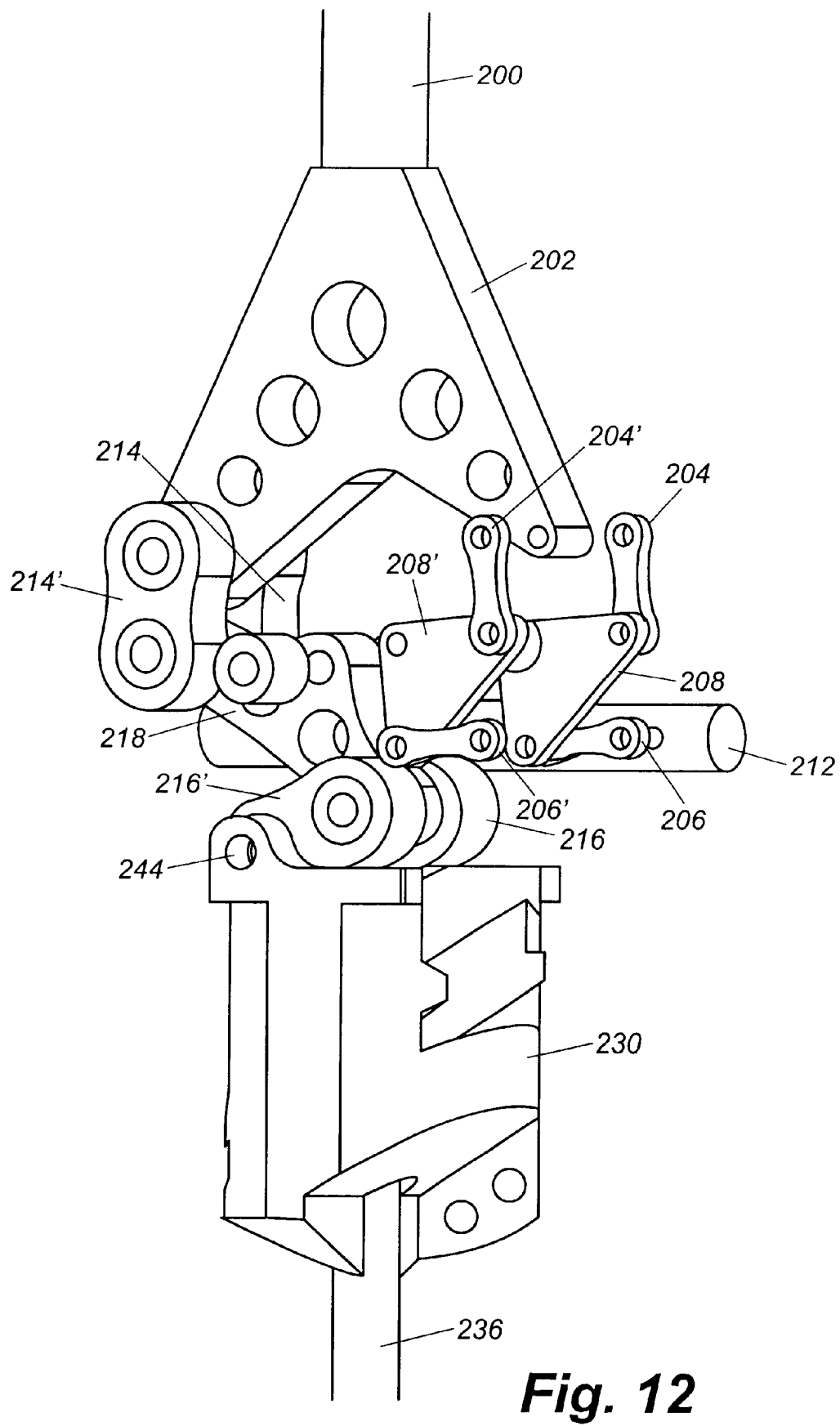
FIG. 12 is an partially exploded perspective view of a contour head of FIG. 11.

FIGS. 11–16 illustrate a third embodiment of a contour machining head 190 of the present invention. Referring to FIGS. 11 and 12 illustrating a side view and an exploded view of the machining head 190, respectively, a contour machining head 190 is inserted into a machining spindle (not shown). The contour machining head 190 supports a pilot 236 co-axially with the spindle to provide perfect centering on a valve seat. The carriage 230 includes a bit holder seat 242 for attaching a cutting bit holder 232. A cutting bit 234 is attached to the cutting bit holder 232 and is rotated around the spindle axis 201 as the machining head 190 rotates. The carriage 230 moves radially outward and inward with respect to the spindle axis along a carriage feed line CL, CL' to allow the cutting bit 234 to machine any valve seat profile.

Continuing with FIGS. 11 and 12, the carriage head 230 is connected to a lower carriage connecting rod 216, 216' at a carriage connecting joint 244. The lower carriage connecting rod 216 is pivotally attached to a carriage cantilever 218 that pivots around a carriage fixed point 220. For purposes of the invention a cantilever is a rigid structure having a pivot point at its center and arms extending from the pivot point at an angle to each other with connection points at the end of each arm. The cantilever can have a triangular configuration as illustrated, or any other configuration that provides means for transferring force by pivoting the arms about the pivot point. (See, e.g., the embodiment of FIGS. 22–31.) It may also be referred to as a bell crank lever, a triangle or triangular link, or a "pillow block". An upper carriage connecting rod 214, 214' connects the carriage cantilever 218 to an arbor connecting rod 202 that is connected to a driving arbor 200. In a preferred embodiment, the arbor connecting rod 202 and the driving arbor 200 are linked by a mechanical system, e.g. a pressure screw, that allows the machining head to easily separate from the spindle. This system allows a feed movement of the carriage 230 that is independent from the rotation of the machining head 190, and allows the carriage 230 to move radially inward or outward while the machining head 190 is rotating. The carriage head of this embodiment machines both concave and convex shapes, one after the other, during the same machining cycle.

Radial movement of the carriage 230 is achieved when the upper and lower connecting rods 214, 216, the carriage cantilever 218, and the arbor connecting rod 202 are pushed or pulled by the driving arbor 200. A downward force on the arbor connecting rod 202 causes the carriage 230 to move radially inward towards the spindle axis 201 along the carriage line CL, CL'. Similarly, an upward force on the arbor connecting rod 202 causes the carriage 230 to move radially outward along the carriage line CL, CL'. In other embodiments, the machining head 190 may be designed so that a downward force causes the carriage 230 to move radially outward.

The carriage line of a preferred embodiment is at an angle $\alpha_2$ of 30 degrees with respect to a line perpendicular to the spindle axis 201, as shown in FIG. 10. In other preferred embodiments, the angle $\alpha_2$ of the carriage line CL may range from 0 degrees to 60 degrees. The contour machining head 100 may be designed to have carriage line angles $\alpha2$ greater than 60 degrees, however, severe carriage line angles unduly limit the range of the radial movement of the carriage 230.

Referring again to FIGS. 11 and 12, the contour machining head 190 further comprises a balancing system to maintain balance during the machining process and over the entire range of the carriage. Counter balancing weights 212 are connected to the arbor connecting rod 202 through a lower and upper counterweight connecting rod 206, 204 and a counterweight cantilever 208 that rotates around a counter weight fixed point 210. The counterweight 212 moves in a direction that is diametrically opposed to the movement of the carriage 230. Thus, as the weight of the carriage 230 moves radially outward, the counterweight 212 moves radially outward in the opposite direction to maintain a center weight distribution along the spindle axis 201. FIG. 12 illustrates a partial exploded view. For ease of illustration and clarity, a second counter weight which would normally connect to lower counterweight connecting rod 206' is not shown.

In a preferred embodiment as shown in FIGS. 11 and 12, the machining head utilizes right side and left side components, such as the counter weight connecting rods 204, 204' which are disposed on either side of arbor connecting rod 202. The right and left side components are formed as separate pieces to reduce the amount of material needed to manufacture the components, and to reduce the overall weight of the machining head 190. In alternate embodiments, however, any of the right and left side components may be manufactured as a single unit.

Figure 13:
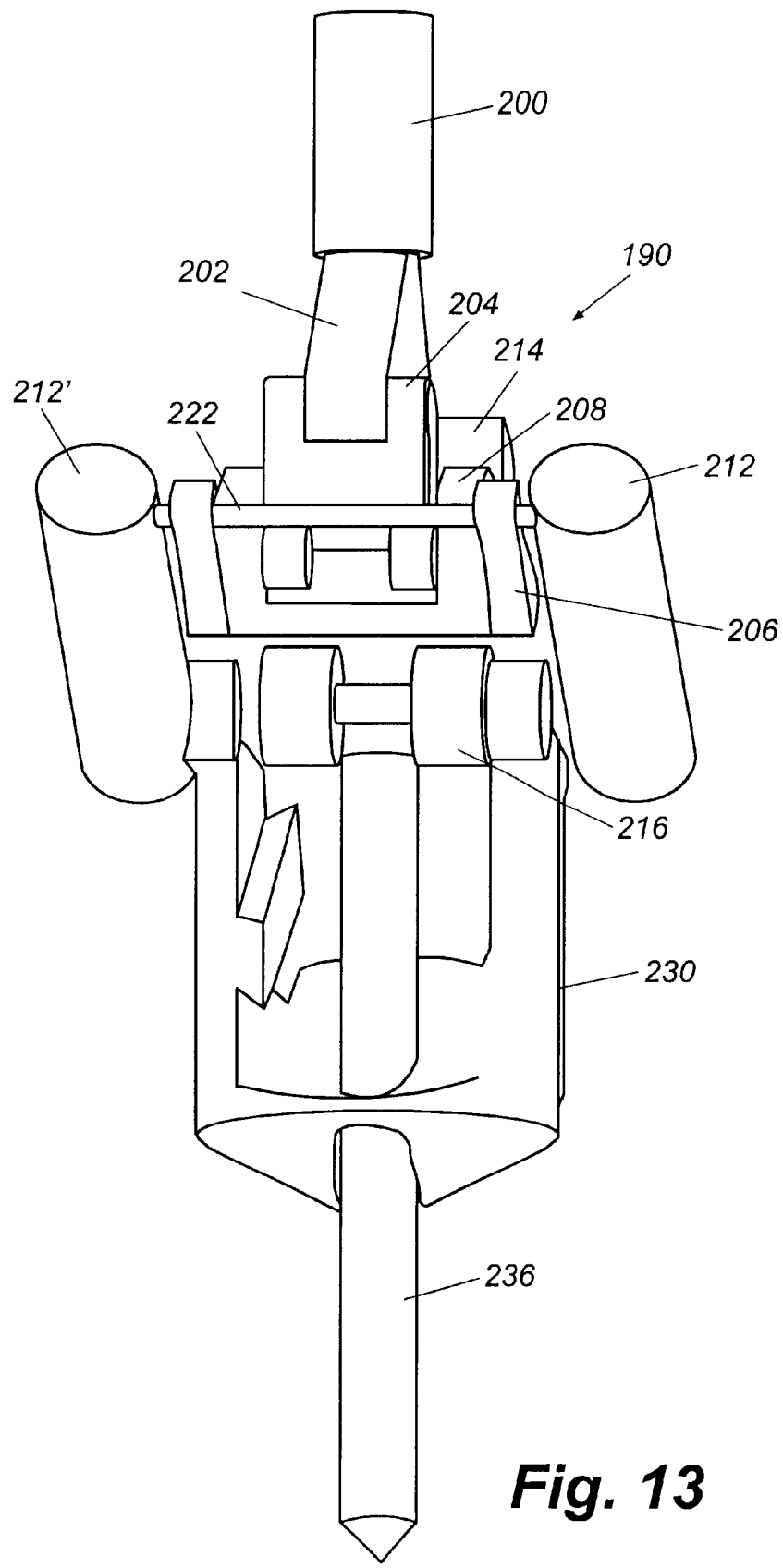
FIG. 13 is a second perspective view of the contour head of FIG. 11.

FIG. 13 is a perspective view of the contour machining head 190 illustrating the symmetrical structure of the machining head 190 components. In the embodiment of FIG. 13, upper counterweight connecting rod 204 and counterweight cantilever 208 are one-piece components. Right and left side components, such as right and left counterweights 212, 212', may also be connected utilizing jointing connections 22 to maintain cooperative operation of the individual components.

Figure 14:
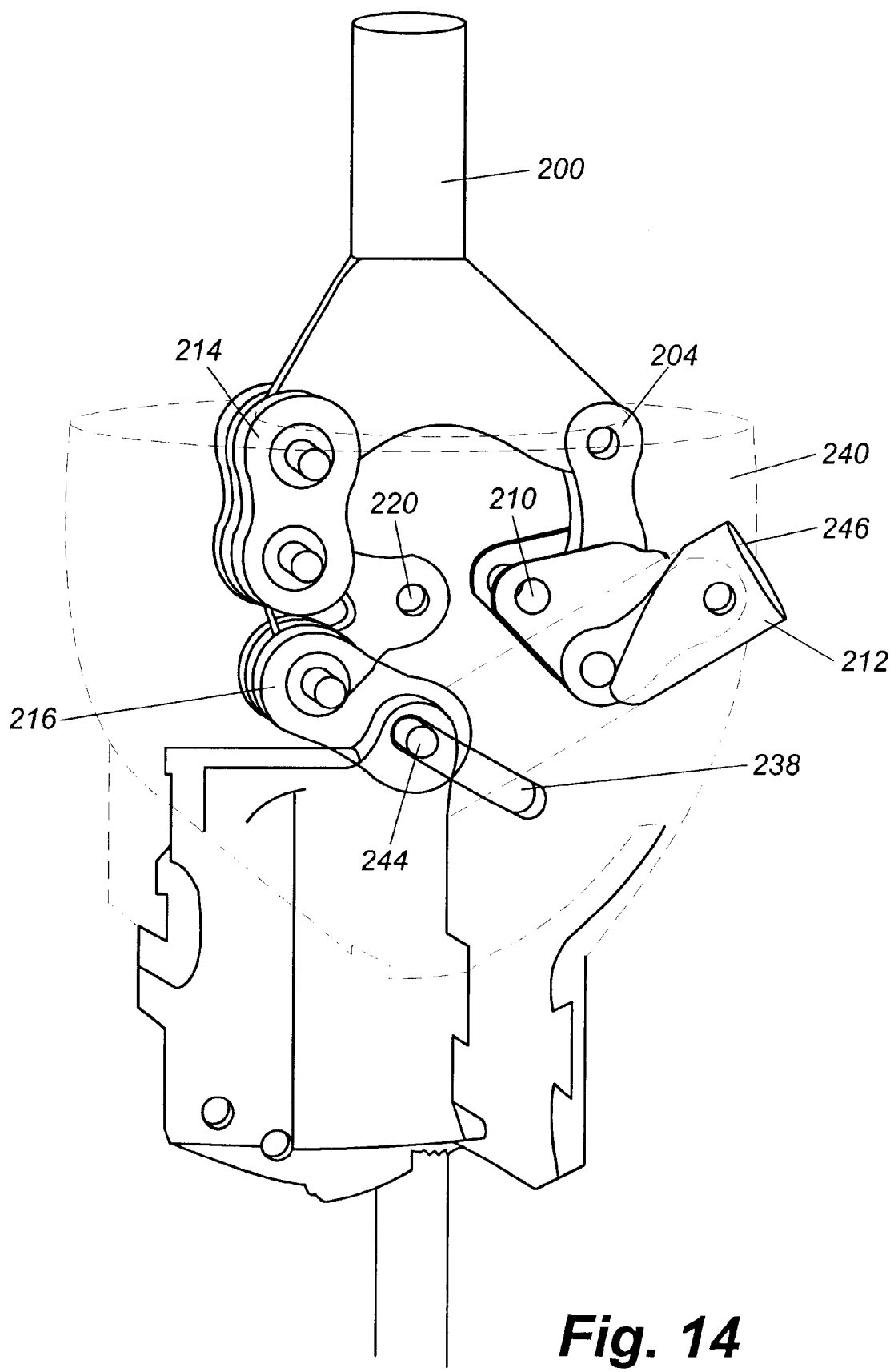
FIG. 14 is a third perspective view of the contour head of FIG. 11 illustrating a carriage guide.

FIG. 14 illustrates a perspective view of the third embodiment of the present invention enclosed in a machining head sheath 240. The sheath 240 of a preferred embodiment includes counterweighting channels 246 for supporting and guiding the counterweights 212. A carriage line guide recess 238 accepts a carriage connecting joint 244 to guide the carriage along the carriage line CL.

Figure 15:
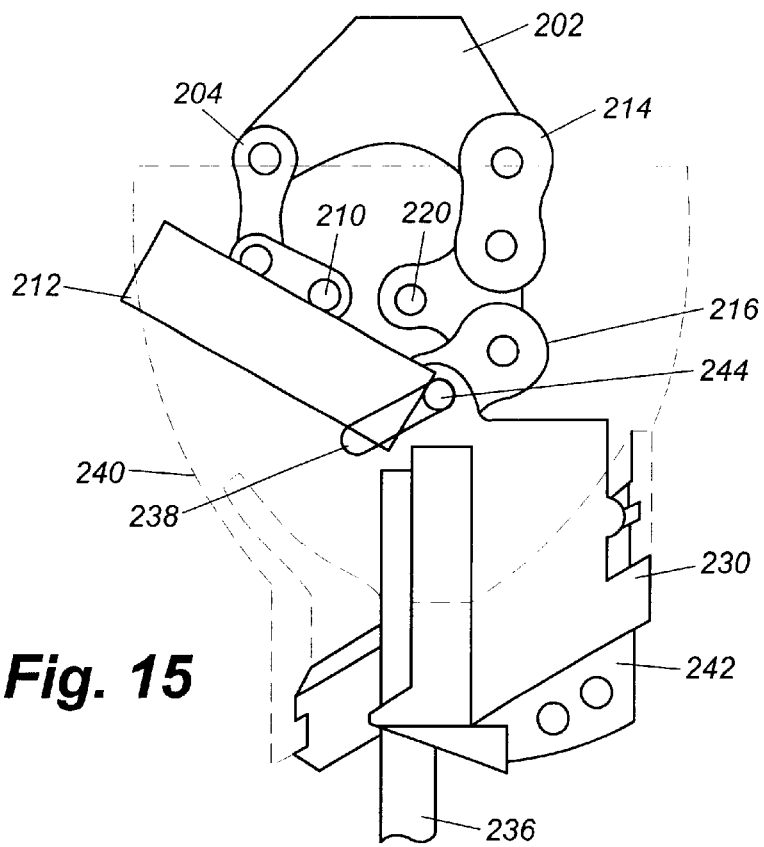
FIG. 15 illustrates the contour head of the third embodiment in a position extended radially outward.
Figure 16:
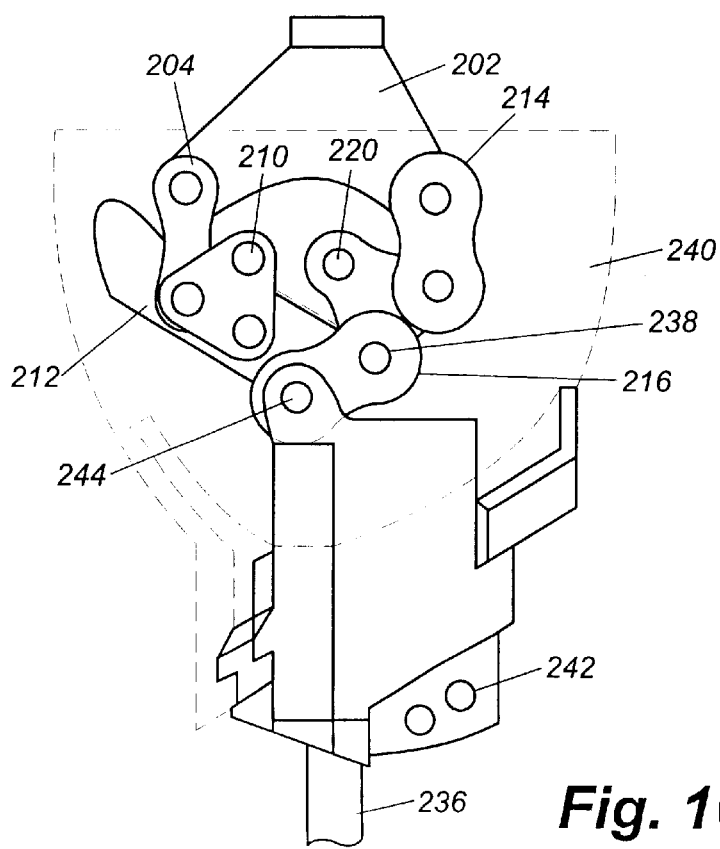
FIG. 16 illustrates the contour head of the third embodiment in a position extended radially inward.

FIGS. 15 and 16 illustrate the operation of the machining head 190 of the third embodiment. Referring to FIG. 15, the bit holder seat 242 is shown positioned radially outward from the pilot 236. Carriage connecting joint 244 is positioned proximate an end of carriage line guide 238 indicating that carriage 230 is extended outward to the maximum extent of its travel. Carriage 230 and counterweight 212 rotate around the carriage fixed point 220 and counterweight fixed point 210, respectively. FIG. 16 illustrates carriage 230 in a retracted position. Arbor connecting rod 202 is pushed downward. The down ward force translates into a downward motion of carriage connecting joint 244 in carriage line guide 238. Fixed points 210 and 220 remain fixed relative to sheath 240.

Figure 17:
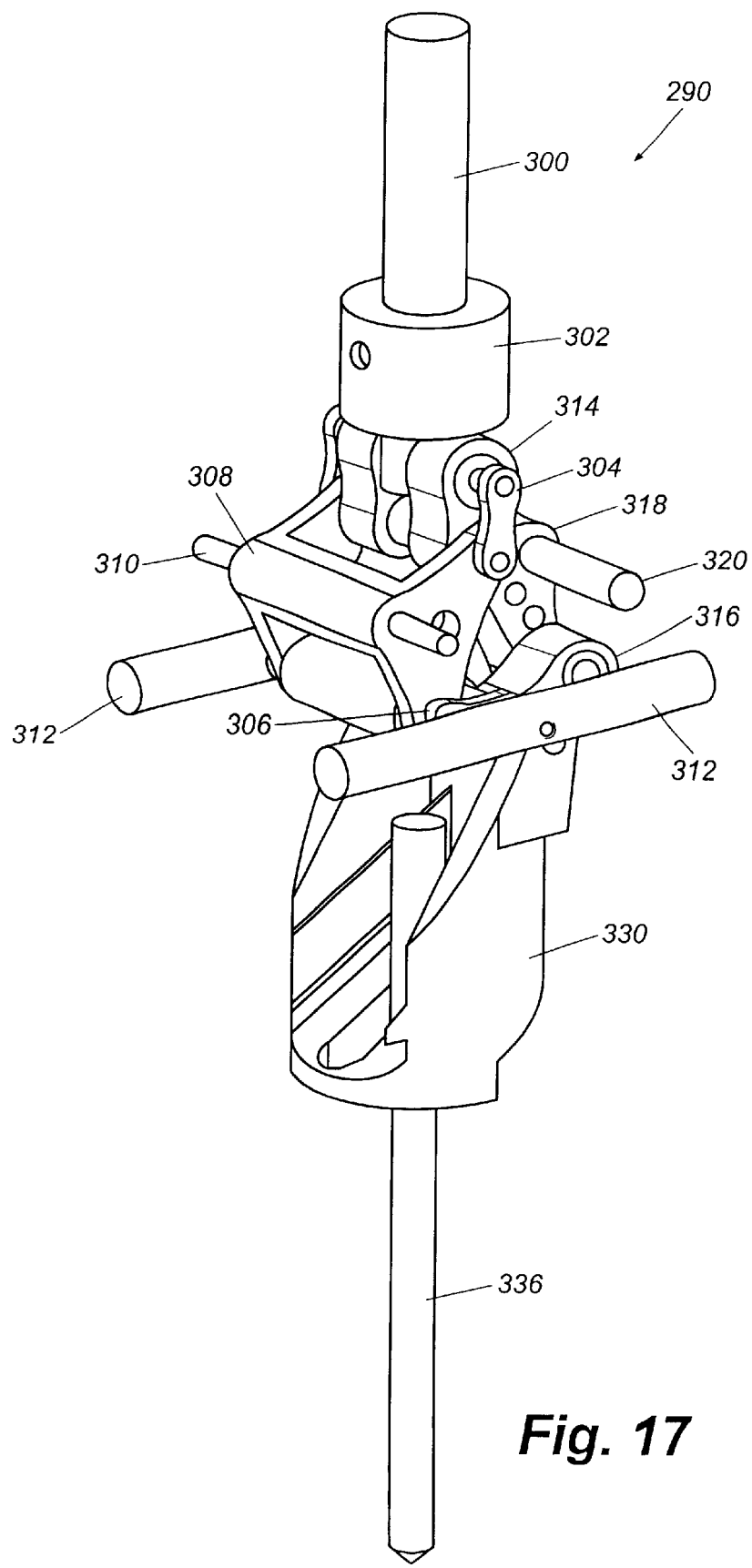
FIG. 17 illustrates the contour head of a fourth embodiment of the present invention.

FIG. 17 is a perspective view of a fourth embodiment of a machining head 290 of the present invention. In the fourth embodiment, a driving arbor 300 extends through a fixed collar 302 to drive the radial movement of the carriage 330. Carriage head 330 is connected to a second carriage connecting rod 316. Carriage connecting rod 316 is attached to carriage head cantilever 318 which, in turn, is attached to first carriage connecting rod 314. First carriage connecting rod 314 is connected to driving arbor 300. A downward force of driving arbor 300 lowers first carriage connecting rod 314, which lowers a portion of carriage head cantilever 318. Because carriage head cantilever 318 rotates on carriage head fixed point 320, a lower portion of carriage head cantilever 318 is forced upward along with second carriage connecting rod 316. The upward movement of second carriage connecting rod 316 causes the carriage head to move radially with respect to pilot 336. Balancing weights 312, 312' are similarly connected to driving arbor 300 through upper and lower balancing weight connecting rods 304, 306 and balancing weight cantilever 308. Balancing weights 312, 312' move in a direction diametrically opposite the direction of movement of carriage head 330.

FIGS. 18, 19, and 20 illustrate the operation of the machining head 290 of the fourth embodiment enclosed in an outer sheath 340. Referring to FIG. 18, cutting bit 334 is positioned proximate the pilot 336 that is concentric with the machining head 290 spindle axis (not shown). As driving arbor 300 is forced downward, as shown in FIG. 19, cutting bit 334 is moved radially outward from the spindle axis. The downward force causes balancing weight cantilever 308 to rotate on the balancing weight fixed point 310 to move balancing weight 312 outwards from the spindle axis. FIG. 19 further illustrates the movement of upper balancing weight connecting rod 304 and first carriage connecting rod 314. The downward force on the driving arbor pushes these components downward with respect to fixed collar 12. FIG. 20 illustrates cutting bit 334 positioned at a maximum radial distance from the spindle axis. The balancing weight is shown positioned near the edge of sheath 340. Upper balancing weight connecting rod 304 and first carriage connecting rod 314 are positioned below fixed collar 302. An upward pull of driving arbor 300 will provide an radially inward movement of rotating cutting bit 334.

Figure 21:
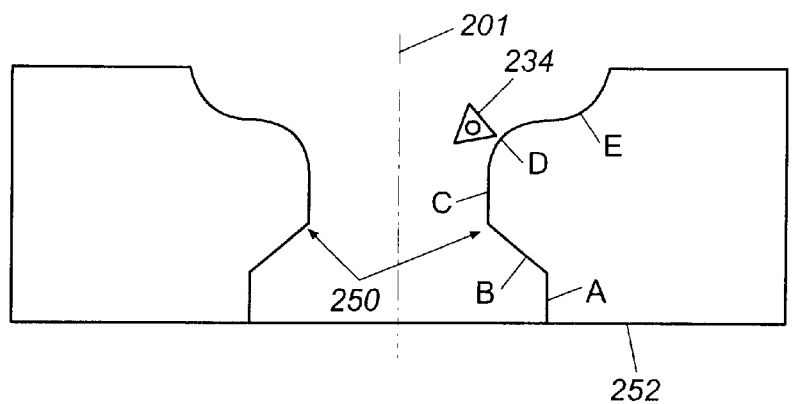
FIG. 21 is a diagrammatic view of the profile of a rounded opening that can be machined using the third, fourth or fifth embodiment of the present invention.

FIG. 21 illustrates an exemplary profile of a valve seat 250 of a cylinder head 252 machined utilizing the third and fourth embodiments of the present invention as described above. The machining of a variety of segment types is possible, including a concave segment E, a convex segment D, a vertical segment C, and an inclined segment B. Machining may start at any radial point from spindle axis 201. In one method of machining a valve seat 250, cutting bit 234 is positioned at the lower portion of valve seat 250, and segments A, B, C, D, and E are machined in sequence. As cutting bit 234 moves upward from segment A to C, the carriage moves radially backward with respect to spindle axis 201. The machining head of the preferred embodiments allows machining of vertical segment C, wherein the radial position of cutting bit 234 is maintained and the entire machining head is moved upward, or downward, utilizing a stepper motor or a servo motor. As cutting bit 234 machines segment D and segment E, the carriage moves radially outward with respect to spindle axis 201. In other embodiments, machining of valve seat 250 may start at any point in the profile to be machined. In addition, segments A, B, C, D, and E may be machined individually or in sequence. The travel of the cutting tool is optimized according to the shape of the raw valve seat.

The software stored within the system controller permits creation of any desired profile having up to 99 different segments. Each line segment within a profile is defined by its length or by its projection along the x-axis, i.e., difference in diameter, and by its angle. Angles may range from −10 degrees to 110 degrees with respect to horizontal. Arcs or radii are defined by the beginning and ending tangents and by their radius. Using a touch screen for input, a profile containing 10 line segments or radii can be quickly created and saved. Any dimension or angle can be edited.

All entered profiles can be stored in the database together with information relating to a particular cylinder head or other work piece. In the preferred embodiment, a program is created for each cylinder head model, including parameters for roughing and finishing profiles as well as machining speed, feed rate per revolution, depth of each machining pass and the number of valve seats to be machined. A program can be retrieved by a machine operator in the case of a stand alone machine, or automatically, in the case of an automatic transfer machine.

After entry of the desired profile and the dimensions of the raw valve seat, the software automatically calculates the different machining cycles needed to achieve the profile. The roughing and finishing passes are differentiated by their respective depth and feed rates per revolution. Quality control information such as internal and external diameters of a profile, diameter of the seat, and a line representation of the profile are displayed on the display screen.

Where multiple machining heads are used in an automated transfer machine, each machining head is run by an independent control board. All control boards are interconnected via an industrial bus, type CAN (1 Mb/s). One or several PCs are linked to that same bus, allowing each PC to access the is parameters of the other machining heads. For transfer machine applications, the machining parameters are preferably stored in a non-volatile memory, such as flash EPROM, that is included in the machining head's control board. Cycle starts are triggered via a local digital I/O port for each control board. Each control board has its own RS-232 link available for special applications.

Figure 22:
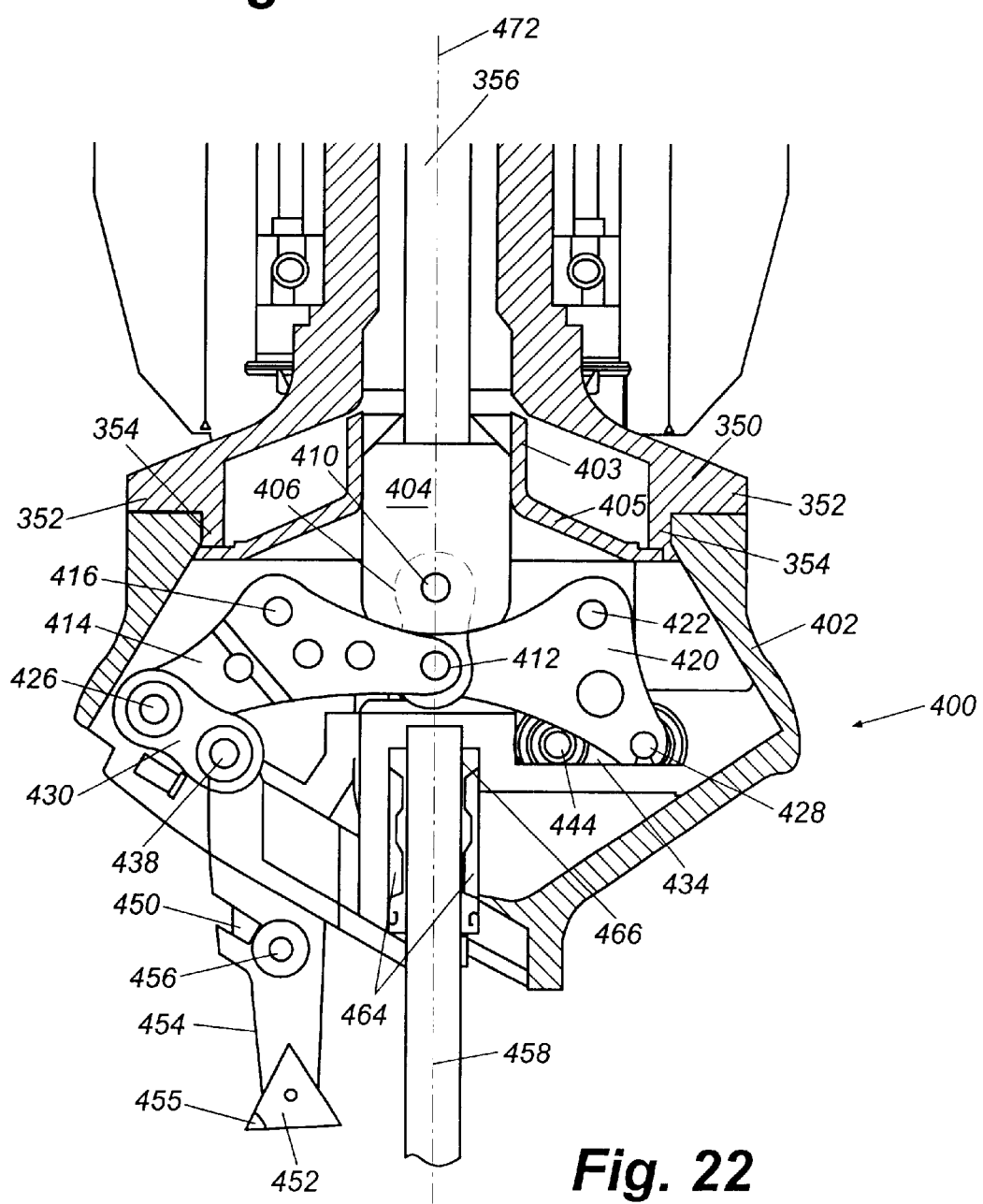
FIG. 22 is a diagrammatic side view of a fifth embodiment of a contour machining head.

A fifth embodiment of the present invention is illustrated in FIGS. 22–32. As in the fourth embodiment, counterweights are used to maintain the dynamic balance of the rotating machining head to such a level of precision that speeds of 3000 to 5000 rpm or higher can be attained during machining. As shown in FIG. 22, spindle 350 is mounted within an appropriate machining head support 360. In applications to valve seat machining, machining head support 360 can be a housing such as spherical housing 160 shown in FIG. 10, or a similar mounting which permits angular displacement of contour machining head 400 at angles needed to access the valve seats. For other applications, such as transfer machines, a similar mounting to the spherical housing, for angular displacement, or a fixed mounting that permits up and down movement and possibly movement in the x-y plane. Selection of an appropriate machining head support for the desired application will be apparent to one of skill in the art.

Still referring to FIG. 22, spindle 350 is attached to the upper portion of housing 402 of contour machining head 400 using screws or other appropriate fasteners (not shown). To enhance rigidity of the connection, and to ensure proper centering, a combination of flange 352 and tapered annular ring 354 in spindle 350 mate with corresponding features formed in housing 402. Flange 352 abuts the upper planar surface of housing 402, while tapered ring 354 fits closely within the inner diameter of housing 402.

Figure 32:
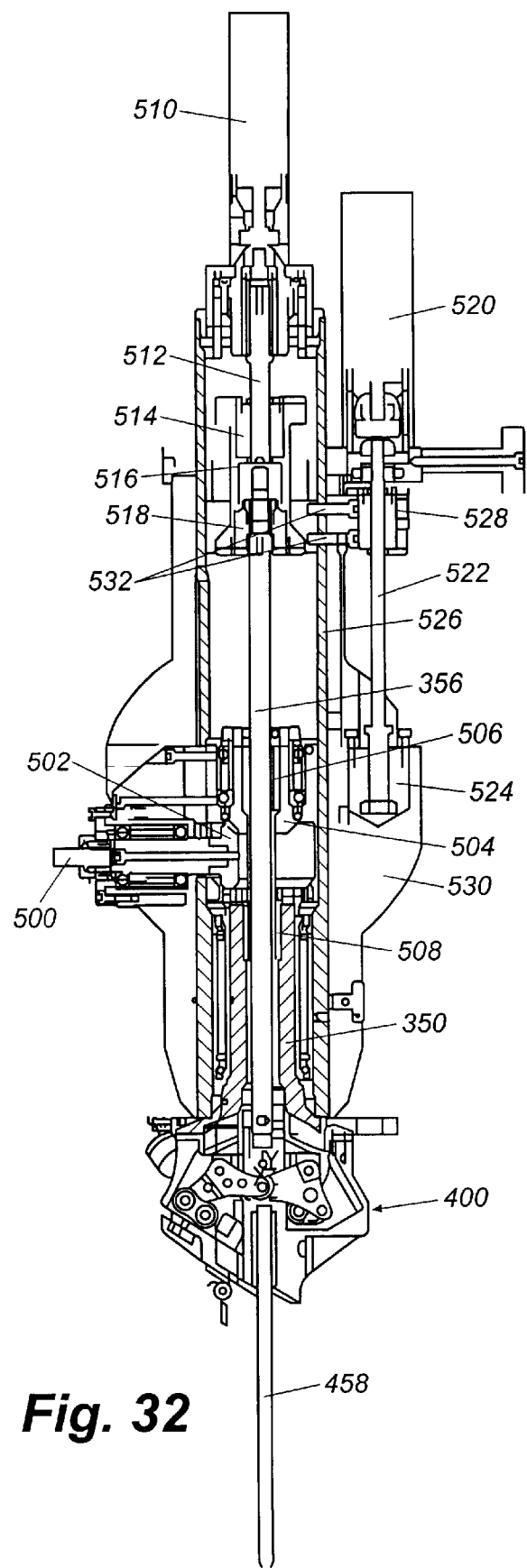
FIG. 32 is a diagrammatic cross-sectional side view of the drive and feed mechanisms for the embodiment of FIG. 22.

Transmission arbor 356 is connected via a combination of bearings and pinions to a rotational drive motor in the manner similar to that described with regard to the previously described embodiment of FIG. 10. Referring to FIG. 32, drive arm 500 provides linkage via a sliding arm homokinetic transmission (not shown) to the drive motor (not shown). Drive arm 500 is connected to leading pinion 502 which drives driven pinion 504. Driven pinion 504 uses linear bearing 506 to transfer rotational force to arbor 356, while arbor 356 transfers rotational force to spindle 350 through linear bearing 508.

Still referring to FIG. 32, to provide a second degree of motion, arbor 356 is also connected at its proximal end to motor 510 or other drive means for effecting axial movement of arbor 356 for carriage feed to change the cutting radius, as described below. Motor 510 drives satellite roller screw 512 which, via nut 514, exerts force on arbor housing 516 disposed at the proximal end of arbor 356 and linked to the arbor via double bearing stop 518, causing axial displacement of arbor 356. Motor 510 may be a stepper motor or servo motor. Preferably, motor 510 is a brushless AC servo motor, such as Model No. HC-MF13-EC available from Mitsubishi. As with the second, third and fourth embodiments, the fifth embodiment is capable of working in both directions, forward and backward. The separate controls for feed and rotation allow the rate of radial travel of the cutting tip to be varied during operation as needed, independent of rotation, permitting rapid variation in cutting diameter to create different profiles. Describing this feature in other words, feed rate per revolution is variable, such that the value P in Equations 1 through 11 is variable.

A third degree of motion is provided by motor 520, which drives axial feed and retraction of spindle 350 and spindle sheath 530, independent of the carriage feed described above. This function serves to provide fine adjustment of height over the workpiece and controls cutting depth, including feeding the cutting tip during rotation to achieve the desired depth. Motor 520 drives satellite roller screw 522 which connects to spindle sheath 530 via reinforced bearings 524. Motor 520 may be a stepper motor or servo motor, but is preferably a brushless AC servo motor, such as Model No. HC-MF13-EC available from Mitsubishi.

Referring to FIG. 22, attached to the distal end of arbor 356 is cap 404 so that cap 404 rotates with arbor 356. The distal end of arbor 356 is inserted into the center opening of cap 404. A set screw (not shown) is inserted through a radial bore in cap 404 to secure attachment between arbor 356 and cap 404. Optional collar 405 can be placed within the inner diameter of housing 402 with a flange portion 403 partially encircling cap 404. Flange portion 403 provides additional stability to cap 404 to further ensure centering. Openings through collar 405 permit connecting rods 406–409 to extend above the radially-extending face of the collar.

Figure 23:
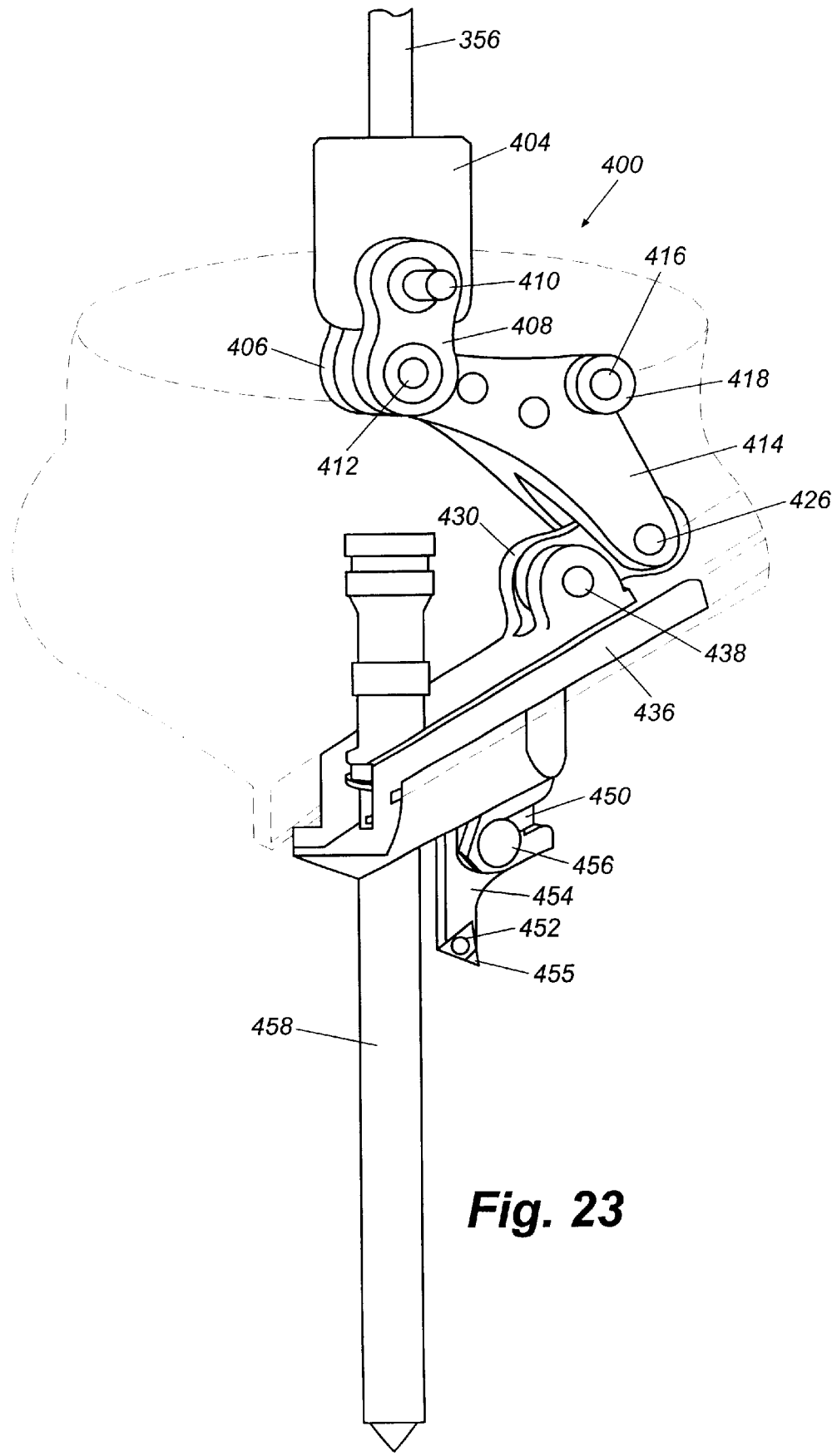
FIG. 23 is perspective view of the carriage assembly of the embodiment of FIG. 22.
Figure 24:
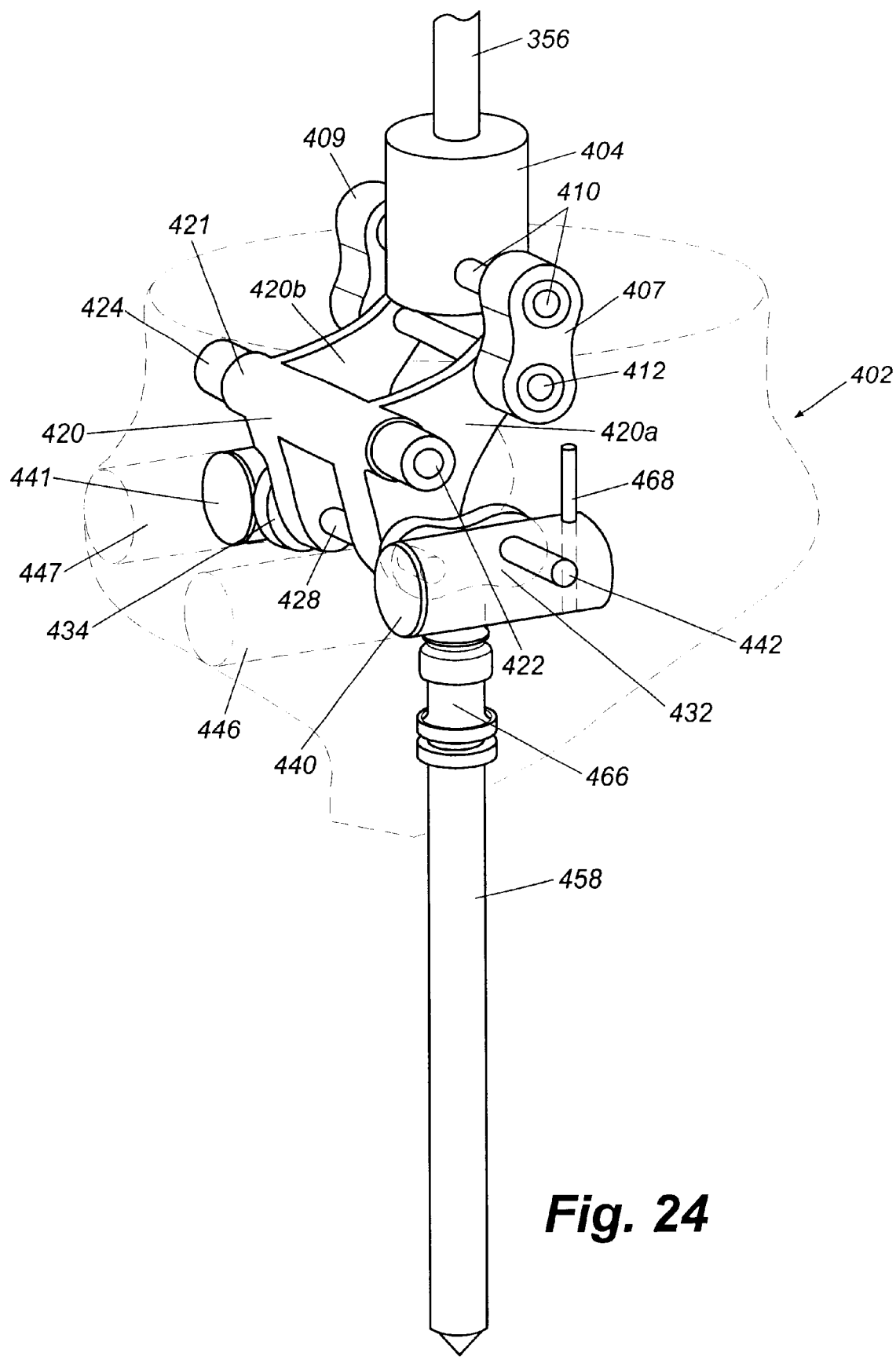
FIG. 24 is a perspective view of the counterweight assembly of the embodiment of FIG. 22.

At the lower end of cap 404 a bore extends through the cap's full diameter. Axle 410 is retained within this bore with its ends extending beyond the outer diameter of cap 404. Connecting rods 406–409 are pivotably attached at their first ends on the ends of axle 410, with connecting rods 406, 407 on one side of cap 404 and connecting rods 408, 409 on the opposite side, as shown in FIGS. 23 and 24. Connecting rods 406, 408 are pivotably attached on their second ends to a first end of cantilever 414 via axle 412. As illustrated in FIG. 23, cantilever 414 is forked with a forked structure, with one arm at its first end and two arms at its second end. This configuration is selected for ease of manufacture and assembly. Other variations will be apparent to those of skill in the art, including one or two one arm cantilevers. Cantilever 414 is pivotably mounted on cantilever axle 416 which is attached in a fixed position to the interior of housing 402. Axle fastener 418, which is shown in FIG. 23, holds cantilever 414 on axle 416. The second end of cantilever 414 is pivotably attached via axle 426 to the first end of connecting rod 430. The second end of connecting rod 430 is pivotably attached via axle 428 to carriage 436.

Figure 31:
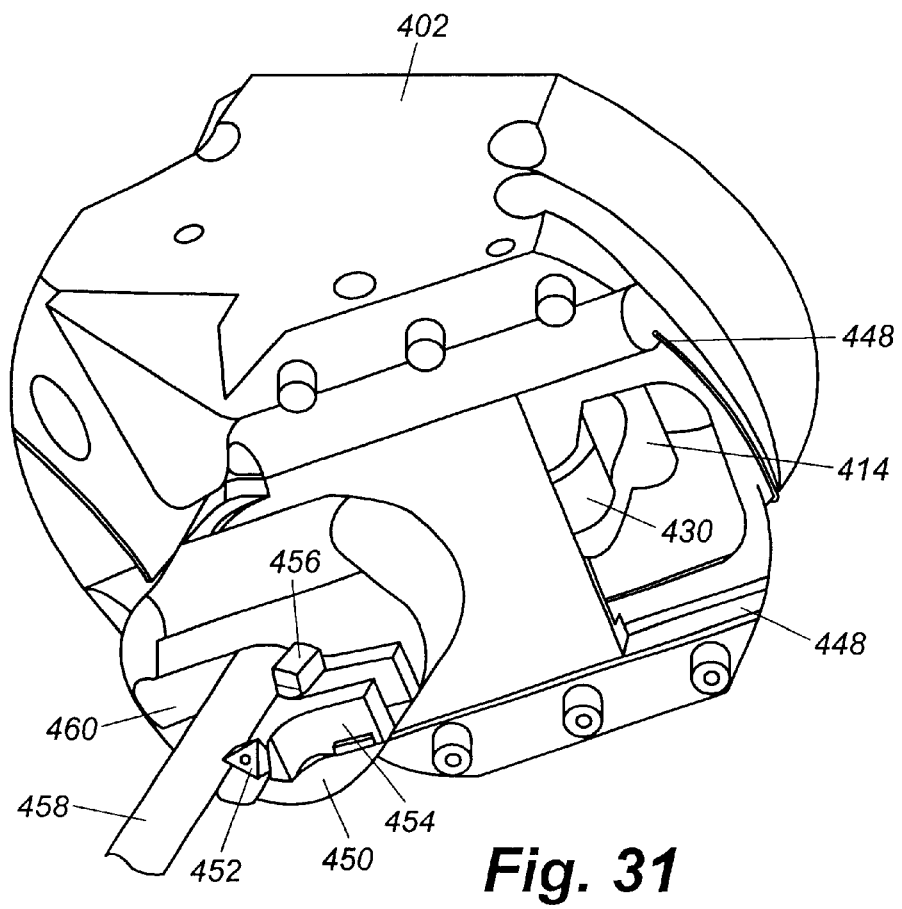
FIG. 31 is a bottom perspective view of the embodiment of FIG. 22 showing the carriage.

Carriage 436 has a pair of upward extension tabs through which axle 428 passes to provide connection to connecting rod 430. Carriage 436 slides radially in contour head 400 on carriage guide 447, which can be formed integrally within housing 402 or attached as separate components, as shown in FIG. 31. Carriage guide 448 has rails 470 formed on opposite sides of opening 474. The spacing of opening 474 is adapted to closely fit an outer width of carriage 436 so that the carriage will slide with minimal resistance along the lengths of rails 470. Carriage tab 450 extends downward from carriage 436. A threaded bore through carriage tab 450 is adapted to receive locking screw 456 which is used to attach bit mount 454 from which the cutting tip 455 of bit 452 extends. In the preferred embodiment, cutting tip 455 is a standard commercially-available triangular cutter made of carbide and/or with a tip of CBN (cubic boron nitride), PCD (polycrystalline diamond), CERMET (ceramic-metal matrix composite), silicon nitride, or other material with a high hardness value. The triangular shape fits closely within a recess formed in the distal end of bit mount 454 to prevent movement of cutting tip 455 relative to bit mount 454. For attachment of a new bit 452, locking screw 456 is inserted through a slot in bit mount 454. Bit 452 is positioned along the carriage by sliding the slot along the shaft of locking screw 456, after which locking screw 456 is tightened to fix the bit in place. Note that the slot can be open, as shown in, e.g., FIGS. 22 and 23, or closed at the end, as shown in FIGS. 18–20. The upper edge of bit mount 454 should abut the bottom surface of carriage 436 for good stability.

As can be seen more clearly in FIG. 23, carriage 436 is slidably disposed within carriage guide 448 which is attached to the lower portion of housing 402 via a plurality of screws or other fasteners 476 (shown in FIG. 31). An upward motion of arbor 356 pulls up cap 404 which, through the linkage provided by connecting rods 406 and 408 lifts the first end of cantilever 414. Cantilever 414 pivots on fixed axle 416 causing the second end of cantilever 414 to swing inward, toward the central axis of the contour head. This motion pushes connecting rod 430 toward the central axis which, through its connection via axle 438 forces carriage 436 to move toward the center along the carriage guide 447, moving cutting bit 452 radially inward, decreasing the cutting diameter. Through the same series of linkages, a downward motion of arbor 356 causes carriage 436 to slide outward, increasing the cutting diameter. An elongated slot 460 is formed in carriage 436 to allow pilot 458 to pass through without contacting the carriage, regardless of the position of the carriage.

In an exemplary embodiment, the lower portion of housing 402 is configured with a 30 degree angle with respect to horizontal so that carriage 436 is disposed at a 30 degree. This angle is particularly suited for applications to engine cylinder head machining since it is the general direction of the profile of valve seats, which are usually between 30 to 45 degrees relative to horizontal. For other applications, the housing should be configured to fall hold the carriage at an angle within the range of the work pieces to be machined. Generally, the closer the angle of the carriage to that of the surface to be machined, the better the surface finish, due to the reduced speed of the motor controlling the vertical feed/retraction of arbor 356. Also, when the entire contour head must be tilted at an angle to make the carriage angle match the work piece angle, the range of diameters that can be machined is reduced. The steeper the angle, the greater the range reduction. Therefore, it is preferable to position the carriage angle to match the angle of the work piece, so that the rest of the contour head is not tilted. However, the greater the carriage angle with the contour head in a normal, non-tilted position, the greater the pressure on the driving pinions, which can result in increased wear. Therefore, a balance should be established when selecting the appropriate carriage angle.

Because contour head 400 is rotating at a relatively high rate of speed (anywhere from 1000 rpm to 5000 rpm and even higher, radial offset of the carriage must be dynamically counterbalanced to maintain centering around the axis of rotation. Counterbalancing is provided by the counterweight assembly shown in FIGS. 22 and 24.

The counterweights move in a direction opposite to that of the carriage. The mass of the counterweights is selected to compensate exactly for the variation of the position of the center of gravity of the head when the carriage is moving. The force "F" that must be applied to arbor 356 to move carriage 436 is equal to $$F = A + C + (M1+M2)W^2KR, \qquad (14)$$

where A=force resulting from friction;
C=force due to resistance of the material being machined;
M1=carriage mass;
M2=counterweight mass;
w=rotational speed;
K=proportionality constant
R=radius of center of gravity of the carriage and counterweights.

The higher the rotational speed and the larger the radius of the surface to be machined, the more important F becomes. Therefore, the carriage mass should be minimized as much as possible. Generally, materials having the smallest mass:rigidity ratio should be selected. Materials that fall within this criteria include aluminum alloys, other metal alloys, ceramics, and composite materials. In the preferred embodiment, the material of which the components of contour head 400 are made is a steel alloy (35NCD16) commonly used for quality tool manufacturing. The parts are preferably vacuum treated. Carriage 436 is coated with a 4500 Hv. carbon-diamond coating to resist wear.

Returning to the counterweight assembly show in FIGS. 22 and 24, connecting rods 407 and 409, connected to cap 404 at axle 410, transfer force from cap 404 to cantilever 420. Cantilever 420 is connected at its first end to connecting rods 407 and 409 via axle 412 and pivots on fixed axle 422 which is connected to housing 402. Cantilever 420 is held onto fixed axle 422 by axle fastener 424. As shown in FIG. 24, cantilever 420 is configured with two separate cantilever arms (420*a* and 420*b*) linked by a fixed sleeve 421 at the axis, so that both arms rotate together. While the formation of the two cantilever arms 420*a*, 420*b* and axle sleeve 421 as a unit ensures simultaneous movement, separate arms may be used as long as they are rigidly joined together so that both move at the same time. The second ends of cantilever 420 are linked via axle 428 to connecting rods 432 and 434. The second end of each connecting rod 432 and 434 is attached via axles 442 and 444 to counterweights 440 and 441, respectively. Counterweights 442 and 444 are slidably disposed within counterweight guides 446 and 447, respectively, which are disposed at equal distances from the axis of rotation of the contour head to ensure proper balance in all directions. It may be necessary to fine tune the counterweights to optimize balance relative to the carriage assembly. In one embodiment, a pin 468 can extend from the counterweights 440, 442 to allow placement of small annular weights, which can be stacked over pin 468 to slightly increase the weight as needed for dynamic counterbalancing. Alternatively, small weights can be added by directly attaching them to the counterweights using small screws which are inserted into a threaded bore in each counterweight 440, 442. The screws can be used to add one or more small washers to provide additional weight to each counterweight.

Figure 25:
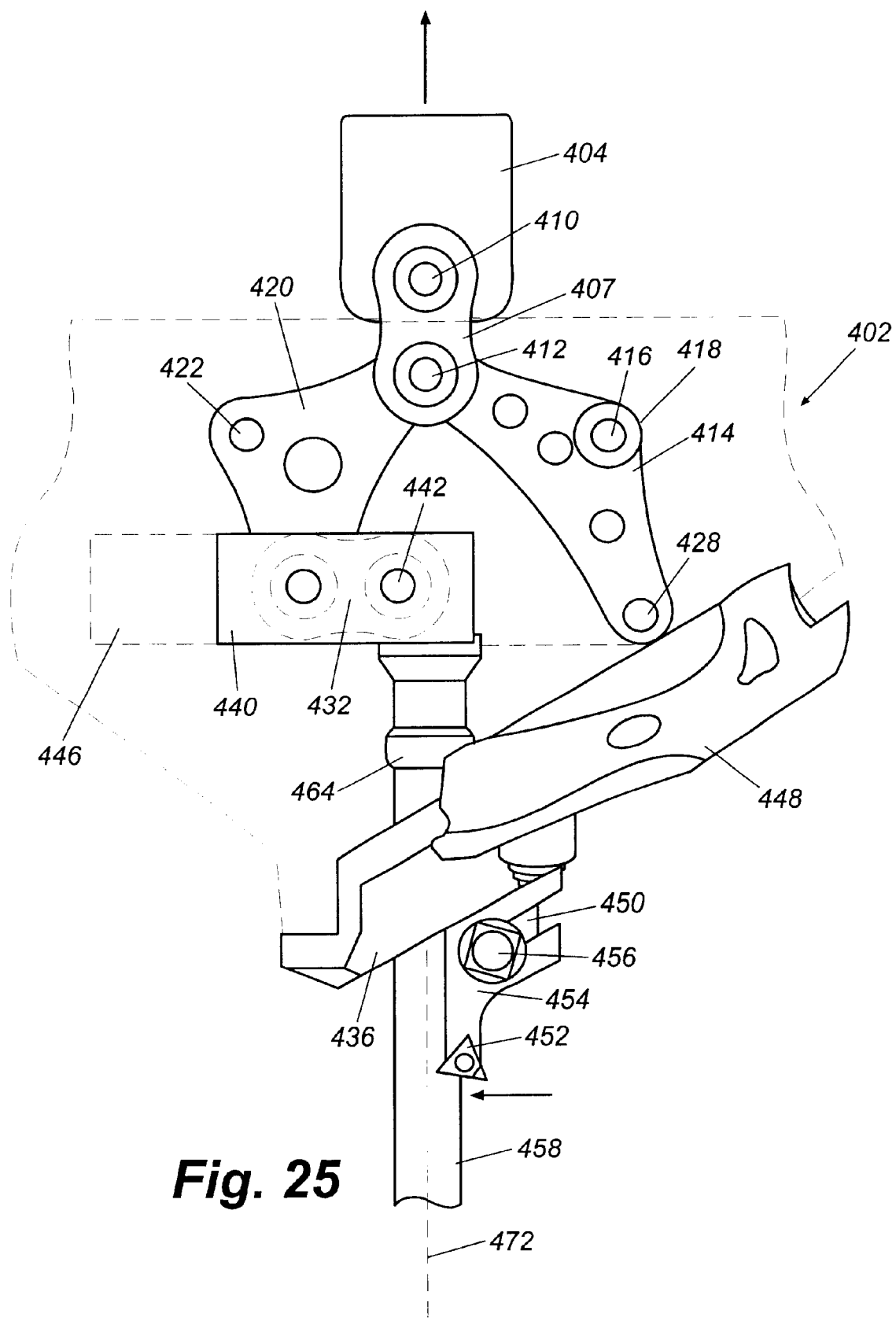
FIG. 25 is side view of the fifth embodiment of the contour machining head with the cutting tip at its minimum radial position.
Figure 26:
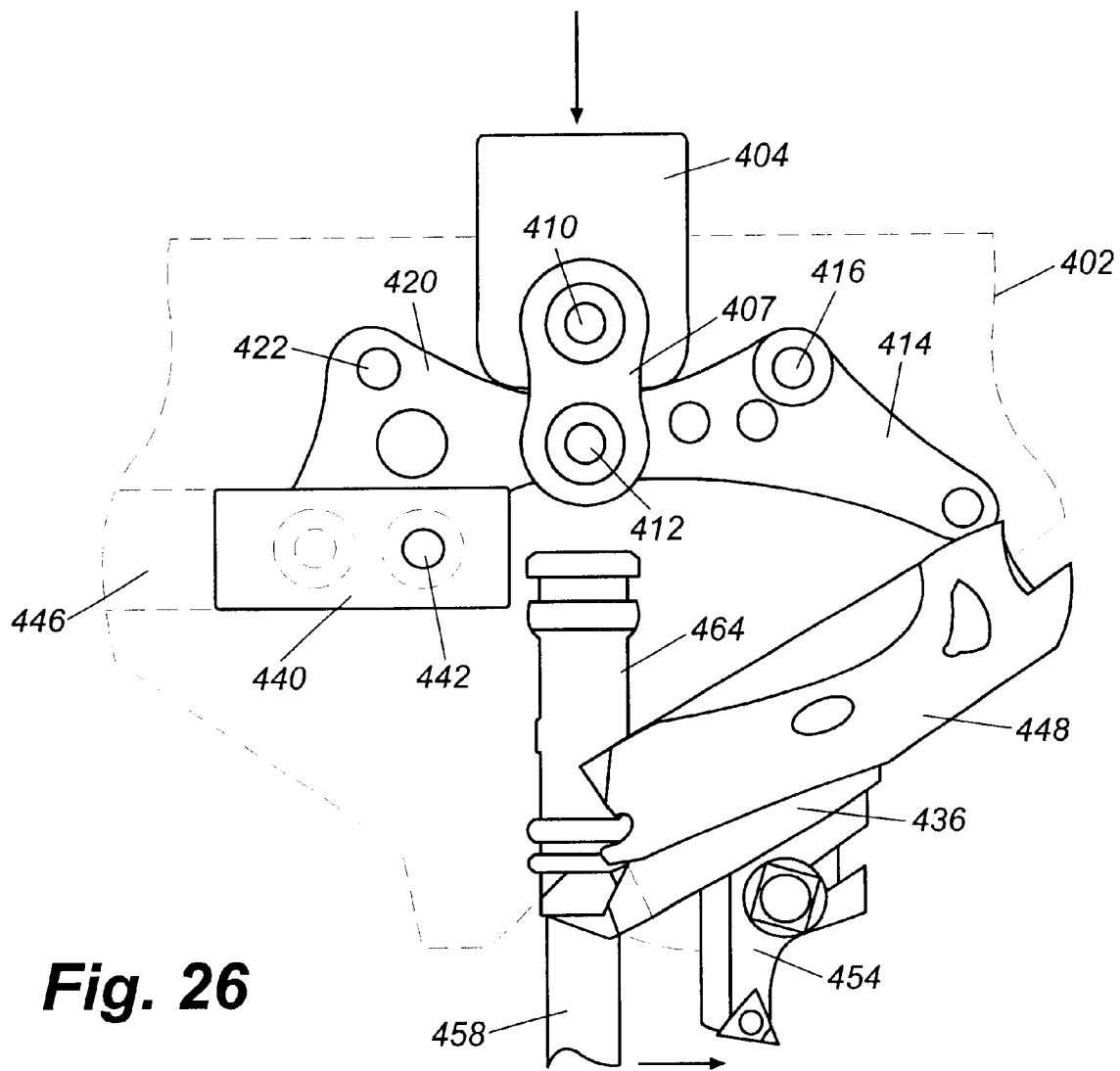
FIG. 26 is a side view of the fifth embodiment of the contour machining head with the cutting tip at its maximum radial position.

When arbor 356 is moved upward, cap 404 pulls connecting rods 407 and 409 upward, which in turn pull up on the first ends of cantilever 420. Cantilever 420 pivots on cantilever axle 422, causing its second end to move away from the axial center of the contour head. Through the connection provided by connecting rods 432 and 434, and axles 428, 442 and 444, counterweights 440 and 441 are forced inward, toward the center. Thus, the movement of arbor 356 causes both carriage 436 and counterweights 440 and 441 to move, so that, with an upward movement of arbor 356, both carriage 436 and counterweights 440 and 441 move radially inward to maintain dynamic balancing around the rotational center. FIG. 25 illustrates the relative positions of the cap 404, cantilevers 414, 420, counterweights 440, 441, and carriage 436 at the minimum radial position for machining. With cap 404 at its highest travel, cantilevers 414 and 420 have the smallest possible angle between them, pulling counterweights 440,441 and carriage 436 radially inward. When arbor 356 moves downward, both carriage 436 and counterweights 440 and 441 move radially outward. The maximum radial position is illustrated in FIG. 26, where cantilevers 414 and 420 have the largest possible angle between them. The carriage and counterweight combination permit the contour head to be used for either radial outward or radial inward cutting.

Figure 27:
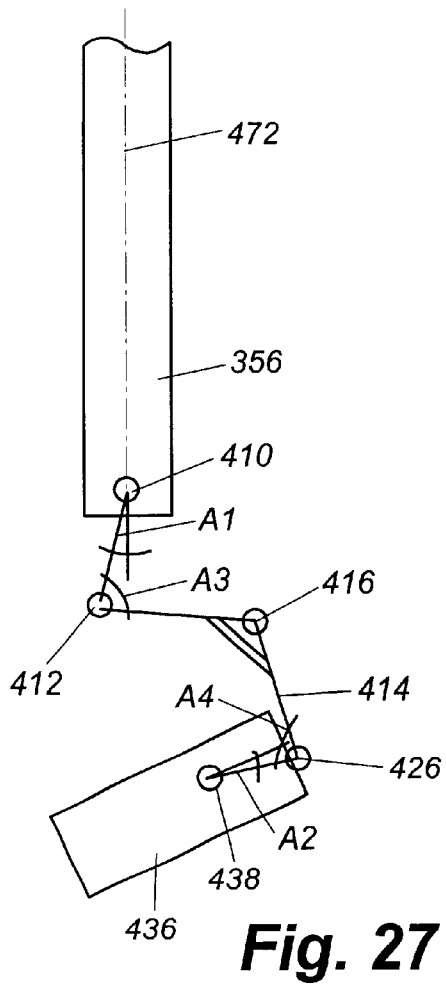
FIG. 27 is a diagrammatic view showing the relative angles of components of the contour machining head.

In order to maintain the needed displacement ratio for maintaining dynamic counterbalancing through the entire travel of the arbor and carriage, the geometric relationships illustrated in FIG. 27 must be preserved. Angle A1, of connecting rods 406, 408 relative to rotational axis 472 must be equal to angle A2, between connecting rod 430 and carriage 436. Angle A3 between connecting rods 406,408 and the first portion of cantilever 414 must be equal, to angle A4, between the second portion of cantilever 414 and connecting rod 430. The connecting rods 406, 408 and 430 must have the same length ratio as the two portions (arms) of cantilever 414 in order to maintain the angle equivalencies.

Figure 28:
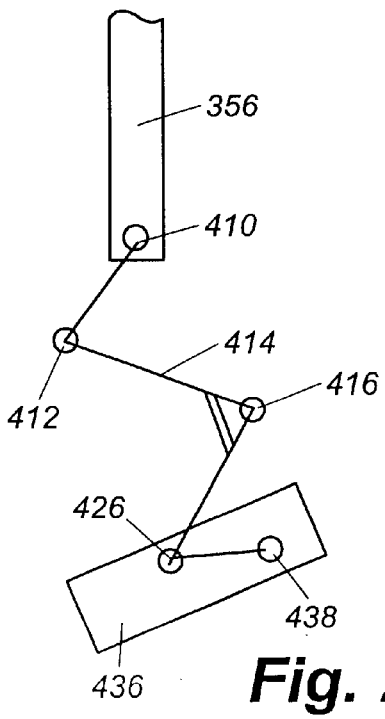
FIG. 28 is a diagrammatic view showing a first alternate configuration of relative angles of components of the contour machining head.
Figure 29:
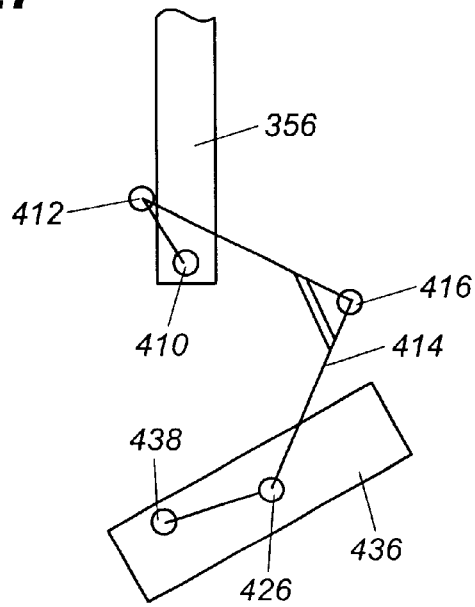
FIG. 29 is a diagrammatic view showing a second alternate configuration of relative angles of components of the contour machining head.

Alternative configurations are shown in FIGS. 28 and 29, which differ from that shown in FIG. 27 due to the change in position of connecting rods 406, 408 and 430 relative to their respective articulation point. In FIG. 28, the first end of connecting rod 430 is located on the opposite side of axle 438 compared to the embodiment of FIG. 27. In FIG. 29, the second ends of connecting rods 406, 408 are located above axle 410.

Figure 30:
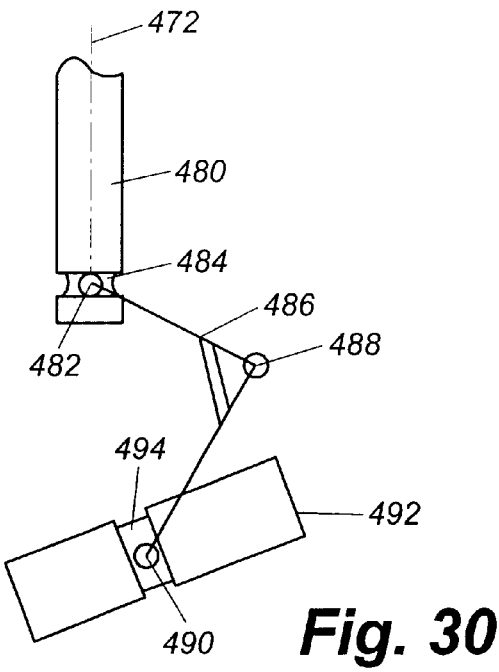
FIG. 30 is a diagrammatic view of an alternate carriage control mechanism.

In an alternate embodiment, connecting rods are eliminated and replaced with a combination of bearings and grooves, as shown in FIG. 30. Arbor 480 has a groove 484 formed therein for slidably receiving bearing 482. Bearing 482 is attached to the first end of cantilever 486, which pivots on fixed axle 488, allowing bearing 482 to slide within groove 484. At the second end of cantilever 486, a second bearing 490 slides within groove 494 formed in carriage 492. When arbor 480 moves upward, bearing 482 slides within groove and the first arm of cantilever 486 is lifted causing the second arm of cantilever 486 to lift bearing 490 through groove 494, pulling carriage 492 radially inward. Generally, the grooves allow a certain amount of play between the connections which makes the previously-described (fifth) embodiment of the invention preferable, particularly when it is desirable to move the carriage both ways during machining.

As described with regard to other embodiments, pilot 458 permits centering of the contour head within the opening to be cut. For engine cylinder head applications, pilot 458 is inserted into the valve guide which is centered on the valve seat. For other applications, such as manufacturing, the pilot may be omitted, or a pre-drilled pilot hole will preferably be provided to guide the tool for centering. Pilot 458 is held within pilot socket 466 in housing 402. A hydraulic clamp 464 is placed inside socket 466. Clamp 464 is activated by turning one or more screws or knobs which extend into oil reservoir 465. Displacement by the screws forces oil from reservoir 465 into the clamp, coaxially locking pilot 458 so that it is held rigidly and concentrically.

The contour machining head, and particularly the fourth and fifth embodiments described herein, are dynamically balanced and capable of operation which is play-free with zero backlash for optimum precision and near-perfect machining qualities. Such precision cannot be achieved using a transmission with pinions, endless screws, racks, etc. of conventional machining heads. The dynamic balance and lack of play allows the cutting tip to be moved inward or outward during operation at will, so that concave profiles, convex profiles, or any combination thereof can be machined.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

What is claimed is:

1. A machining head for machining an opening in a work piece comprising:
   a housing;
   a spindle attached to an upper portion of the housing;
   an arbor disposed concentrically within the spindle and having an axis of rotation, wherein a distal end of the arbor extends through the upper portion of the housing;
   a first motor linked to the arbor for rotating the arbor and spindle;
   a second motor linked to a proximal end of the arbor for axial translation of the arbor;
   a carriage feed assembly disposed within the housing, the carriage feed assembly comprising:
      a first cantilever having a first arm, a second arm and a first pivot point pivotally mounted on a first cantilever axle within the housing;
      a first connector pivotally connecting the distal end of the arbor and the first arm of the first cantilever;
      a carriage guide disposed at a lower portion of the housing, the carriage guide extending radially from a rotational center of the housing;
      a carriage slidably disposed within the carriage guide;
      a cutting bit extending from a lower portion of the carriage, the cutting bit comprising a single cutting tip;
      a second connector pivotally connecting the second arm of the first cantilever and the carriage, wherein axial movement of the arbor provides force for sliding the carriage within the carriage guide;
   a counterweight assembly disposed within the housing, the counterweight assembly comprising:
      a second cantilever having a first arm, a second arm and a second pivot point pivotally mounted on a second cantilever axle in the housing;
      a third connector pivotally connecting the distal end of the arbor and the first arm of the second cantilever;
      at least one counterweight guide within the housing;
      a counterweight slidably disposed within the at least one counterweight guide;
      a fourth connector pivotally connecting the second arm of the second cantilever and the at least one counterweight, wherein axial movement of the arbor provides force for sliding the counterweight within the at least one counterweight guide;
      wherein the counterweights are adapted to counterbalance the weight of the carriage feed assembly when the carriage and cutting bit move radially.

2. The machining head of claim 1, further comprising a third motor linked to the spindle for axial translation of the spindle.

3. The machining head of claim 2, wherein each of the first and second motors is a brushless AC servo motor.

4. The machining head of claim 1, wherein the at least one counterweight guide comprises two counterweight guides disposed on opposite sides of the axis of rotation and one counterweight is slidably disposed in each counterweight guide.

5. The machining head of claim 4, wherein the second cantilever comprises two second arms, each second arm linked to its corresponding counterweight by a separate fourth connector.

6. The machining head of claim 5, wherein the first connector comprises two connecting rods pivotably connected to the distal end of the arbor by a first axle and pivotably connected to the first arm of the first cantilever by a second axle.

7. The machining head of claim 1, wherein the first connector comprises at least one connecting rod.

8. The machining head of claim 1 wherein the third connector comprises at least one connecting rod.

9. The machining head of claim 1, wherein the third connector comprises two connecting rods pivotably connected to the distal end of the arbor by a first axle and pivotably connected to the first arm of the second cantilever by a second axle.

10. The machining head of claim 1, further comprising a pilot retained within a pilot socket in the housing and extending from the housing for centering the machining head on the work piece.

11. The machining head of claim 10, wherein the pilot socket comprises a hydraulic clamp.

12. The machining head of claim 1, wherein the counterweight further comprises means for attaching additional weight to the counterweight.

13. The machining head of claim 1, wherein the lower portion of the housing has an angle formed therein so that the carriage moves at an angle relative to a horizontal surface.

14. The machining head of claim 13, wherein the angle is 30 degrees.

15. The machining head of claim 1, further comprising a system controller connected to each of the first and second motors for controlling rotational speed and vertical displacement rate of the arbor.

16. The machining head of claim 15, wherein the system controller includes a memory for storing a plurality of control parameters for machining rounded openings with a plurality of different profiles.

17. The machining head of claim 1, wherein the counterweight assembly offsets the weight of the carriage feed assembly to dynamically balance the machining head for rotation at up to 5000 rpm.

18. A machining head for use in a machine having a vertical displacement motor and a rotational drive motor for cutting an opening having a predetermined profile, the machining head comprising:
   an arbor having a proximal end and a distal end,
   a motor linked to the proximal end of the arbor for axially feeding and retracting the arbor along an axial line;
   a transmission linkage for transmitting rotational force from the rotational drive motor to the arbor for rotating the arbor around a rotational axis;
   a spindle concentrically disposed around and linked to the arbor so that the spindle rotates around the rotational axis;
   a housing attached to a distal end of the spindle;

a carriage guide disposed at a lower portion of the housing;

a carriage slidably retained within the carriage guide;

a single point cutting bit extending from a lower portion of the carriage;

a carriage feed assembly disposed within the housing, the carriage feed assembly comprising a first cantilever having a first arm pivotably linked to the distal end of the arbor and a second arm pivotably linked to the carriage, the first cantilever pivoting on a cantilever axis attached within the housing, wherein axial feed or retraction of the arbor causes the carriage to move within the carriage guide;

a counterweight assembly disposed within the housing comprising a second cantilever having a first arm pivotably linked to the distal end of the arbor and a second arm pivotably linked to at least one counterweight;

at least one counterweight guide disposed within the housing for slidably retaining the at least one counterweight, wherein axial feed or retraction of the arbor causes the at least one counterweight to move within the at least one counterweight guide;

wherein movement of the carriage within the carriage guide is counterbalanced by movement of the at least one counterweight within the counterweight guide so that rotation of the housing around the rotational axis is balanced.

19. The machining head of claim 18, wherein the spindle is linked to the vertical displacement motor for axial translation of the spindle and the housing, independent of the feeding and retraction of the arbor.

20. The machining head of claim 19, wherein each of the first and second motors is a brushless AC servo motor.

21. The machining head of claim 19, wherein the machine includes a system controller connected to the motor and the rotational drive motor controlling rotational speed and axial feeding and retraction rate of the arbor.

22. The machining head of claim 21, wherein the system controller is further connected to the vertical displacement motor for controlling axial translation of the spindle and housing.

23. The machining head of claim 21, wherein the system controller includes a memory for storing a plurality of control parameters for machining rounded openings with a plurality of different profiles.

24. The machining head of claim 18, wherein the at least one counterweight guide comprises two counterweight guides disposed on opposite sides of the axis of rotation and one counterweight is slidably disposed in each counterweight guide.

25. The machining head of claim 24, wherein the second cantilever comprises two second arms, each second arm linked to its corresponding counterweight by a connecting rod.

26. The machining head of claim 18, wherein the first arm of the first cantilever is pivotably linked to the distal end of the arbor by at least one first connecting rod.

27. The machining head of claim 26, wherein the at least one first connecting rod comprises two connecting rods.

28. The machining head of claim 18, wherein the first arm of the second cantilever is pivotably linked to the distal end of the arbor by at least one second connecting rod.

29. The machining head of claim 28, wherein the at least one second connecting rod comprises two connecting rods.

30. The machining head of claim 18, further comprising a pilot retained within a pilot socket in the housing and extending from the housing for centering the machining head on the work piece.

31. The machining head of claim 30, wherein the pilot socket comprises a hydraulic clamp.

32. The machining head of claim 18, wherein the counterweight further comprises means for attaching additional weight to the counterweight.

33. The machining head of claim 18, wherein the lower portion of the housing has an angle formed therein so that the carriage moves at an angle relative to a horizontal surface.

34. The machining head of claim 33, wherein the angle is 30 degrees.

35. The machining head of claim 18, wherein the counterweight assembly offsets the weight of the carriage feed assembly to dynamically balance the machining head for rotation at up to 5000 rpm.

36. A method for machining an opening to form a predetermined profile in a work piece, the method comprising:

linking a spindle and an arbor concentrically disposed within the spindle to a rotational drive motor;

linking the arbor to a vertical displacement motor;

attaching a machining head to the spindle and the arbor, the machining head comprising a housing, a carriage feed assembly with a single point cutting bit attached thereto, the carriage feed assembly being radially slidable on a lower portion of the housing, and a counterweight assembly, the carriage feed assembly and counterweight assembly being pivotably linked to the arbor;

centering a machining head at a location on the work piece to be machined, activating the vertical displacement motor to vertically displace the arbor, wherein, through the pivotable link, the carriage feed assembly is moved relative to an axis of rotation to position the cutting tip at a starting point on the work piece, and the counterweight assembly is moved to counterbalance radial movement of the carriage feed assembly;

before or after activating the vertical displacement motor, activating the rotational drive motor to rotate the spindle and the machining head so that the cutting tip removes material from the work piece; and further activating the vertical displacement motor to move the carriage feed assembly as the cutting tip removes material from the work piece to create a predetermined profile, wherein movement of the carriage feed assembly is counterbalanced by simultaneous movement of the counterweight assembly.

37. The method of claim 36, further comprising the steps of:

linking the spindle to a second vertical displacement motor; and activating the second vertical displacement motor to vertically displace the spindle and housing.

38. The method of claim 36, wherein the carriage feed assembly and the counterweight assembly are each pivotably linked to the arbor by a cantilever pivoting on a cantilever axis.

* * * * *